United States Patent [19]

Warburton et al.

[11] Patent Number: 5,684,850

[45] Date of Patent: Nov. 4, 1997

[54] METHOD AND APPARATUS FOR DIGITALLY BASED HIGH SPEED X-RAY SPECTROMETER

[75] Inventors: William K. Warburton, 1300 Mills St., Menlo Park, Calif. 94025; Bradley Hubbard, Santa Cruz, Calif.

[73] Assignee: William K. Warburton, Menlo Park, Calif.

[21] Appl. No.: 695,063

[22] Filed: Aug. 2, 1996

Related U.S. Application Data

[60] Provisional application No. 60/002,266, Aug. 14, 1995.

[51] Int. Cl.$^6$ .................................................. G01N 23/083
[52] U.S. Cl. ................................................. 378/53; 364/498
[58] Field of Search ............................. 250/369, 370.06; 364/498; 378/53, 210

[56] References Cited

U.S. PATENT DOCUMENTS

| | | | |
|---|---|---|---|
| 3,872,287 | 3/1975 | Koeman | 235/151.31 |
| 4,593,198 | 6/1986 | Pang et al. | 250/366 |
| 4,642,811 | 2/1987 | Georgopoulos | 378/53 |
| 4,658,216 | 4/1987 | Goulding et al. | 328/109 |
| 5,005,146 | 4/1991 | Lakatos et al. | 364/573 |
| 5,210,423 | 5/1993 | Arseneau | 250/369 |
| 5,349,193 | 9/1994 | Mott et al. | 250/306.06 |

OTHER PUBLICATIONS

Takahashi, H. et al., "A new pulse height analysis system based on fast ADC digitizing technique," *IEEE Transactions on Nuclear Science*, pp. 626–629, vol. 40, No. 4, Aug. 1993.

Georgiev, A. et al., "An analog-to-digital conversion based on a moving window deconvolution," *IEEE Transactions on Nuclear Science*, pp. 1116–1124, vol. 41, No. 4, Aug. 1994.

Al-Haddad, M.N. et al., "Development and testing of a flash analog-to-digital converter based system for pulse shape discrimination of nuclear radiation pulses," *IEEE Transactions on Nuclear Science*, pp. 1765–1769, vol. 41, No. 5, Oct. 1994.

Farrow, R. et al., "X-ray signal processing electronics for solid state detectors," *Rev. Sci. Instrum.*, pp. 2307–2309, vol. 66, No. 2, Feb. 1995.

Jordanov, V.T. et al., "Digital pulse-shape analyzer based on fast sampling of an integrated charge-pulse," *IEEE Transactions on Nuclear Science*, pp. 683–687, vol. 42, No. 4, Aug. 1995.

Jordanov, V.T. et al., "Digital techniques for real-time pulse shaping in radiation measurements," *Nuclear Instruments and Methods in Physics Research A* 353, pp. 261–264 (1994).

Mott, R.B. et al., "Improving EDS performance with digital pulse processing," *X-Ray Spectrometry in Electron Beam Instruments*, pp. 1–28 (D.B. Williams et al., New York, Plenum) (1994).

*Primary Examiner*—David P. Porta
*Assistant Examiner*—David Vernon Bruce
*Attorney, Agent, or Firm*—Townsend and Townsend and Crew LLP

[57] ABSTRACT

A high speed, digitally based, signal processing system which accepts input data from a detector-preamplifier and produces a spectral analysis of the x-rays illuminating the detector. The system achieves high throughputs at low cost by dividing the required digital processing steps between a "hardwired" processor implemented in combinatorial digital logic, which detects the presence of the x-ray signals in the digitized data stream and extracts filtered estimates of their amplitudes, and a programmable digital signal processing computer, which refines the filtered amplitude estimates and bins them to produce the desired spectral analysis. One set of algorithms allow this hybrid system to match the resolution of analog systems while operating at much higher data rates. A second set of algorithms implemented in the processor allow the system to be self calibrating as well. The same processor also handles the interface to an external control computer.

31 Claims, 6 Drawing Sheets

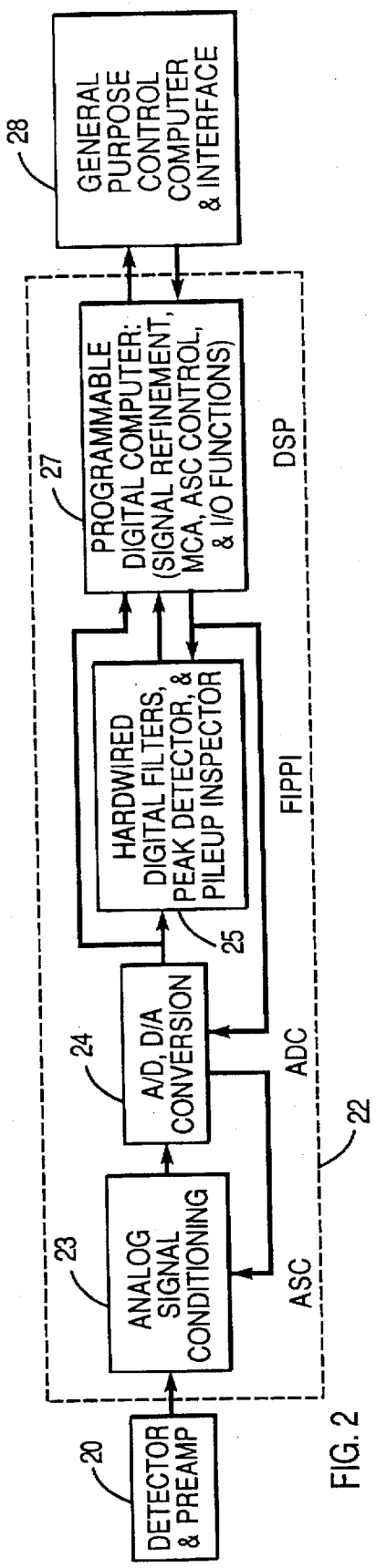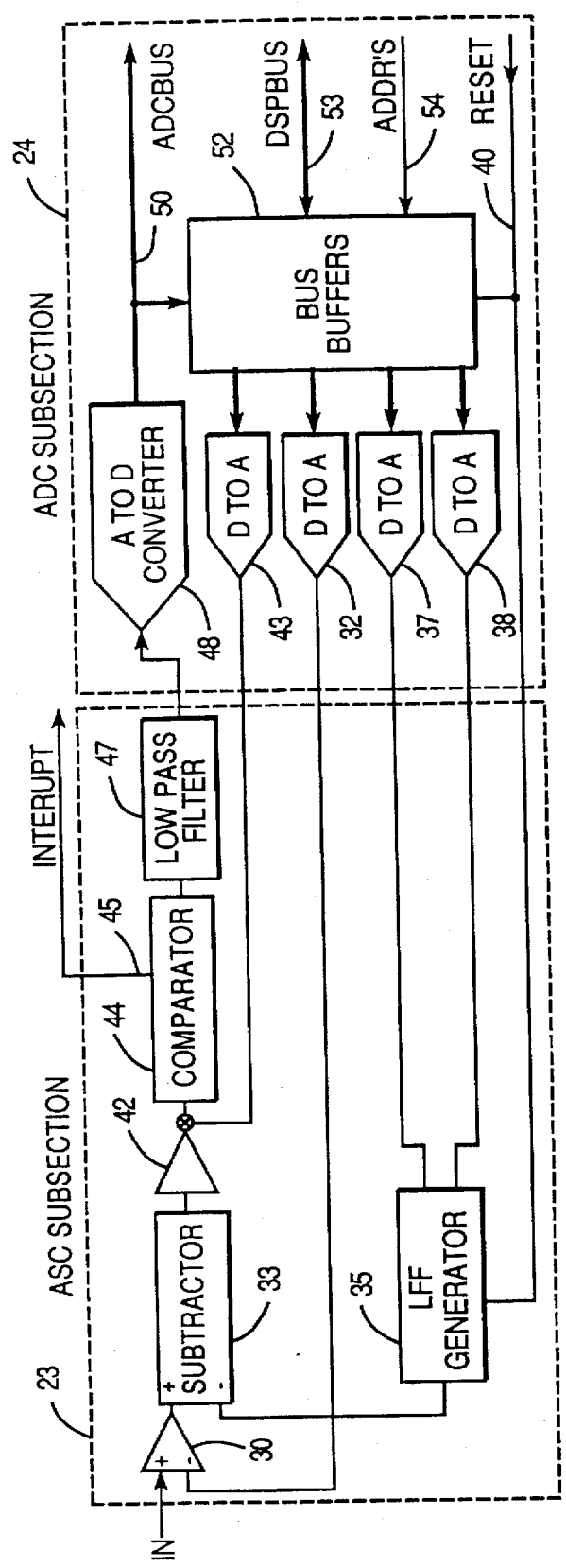
FIG. 2
FIG. 3

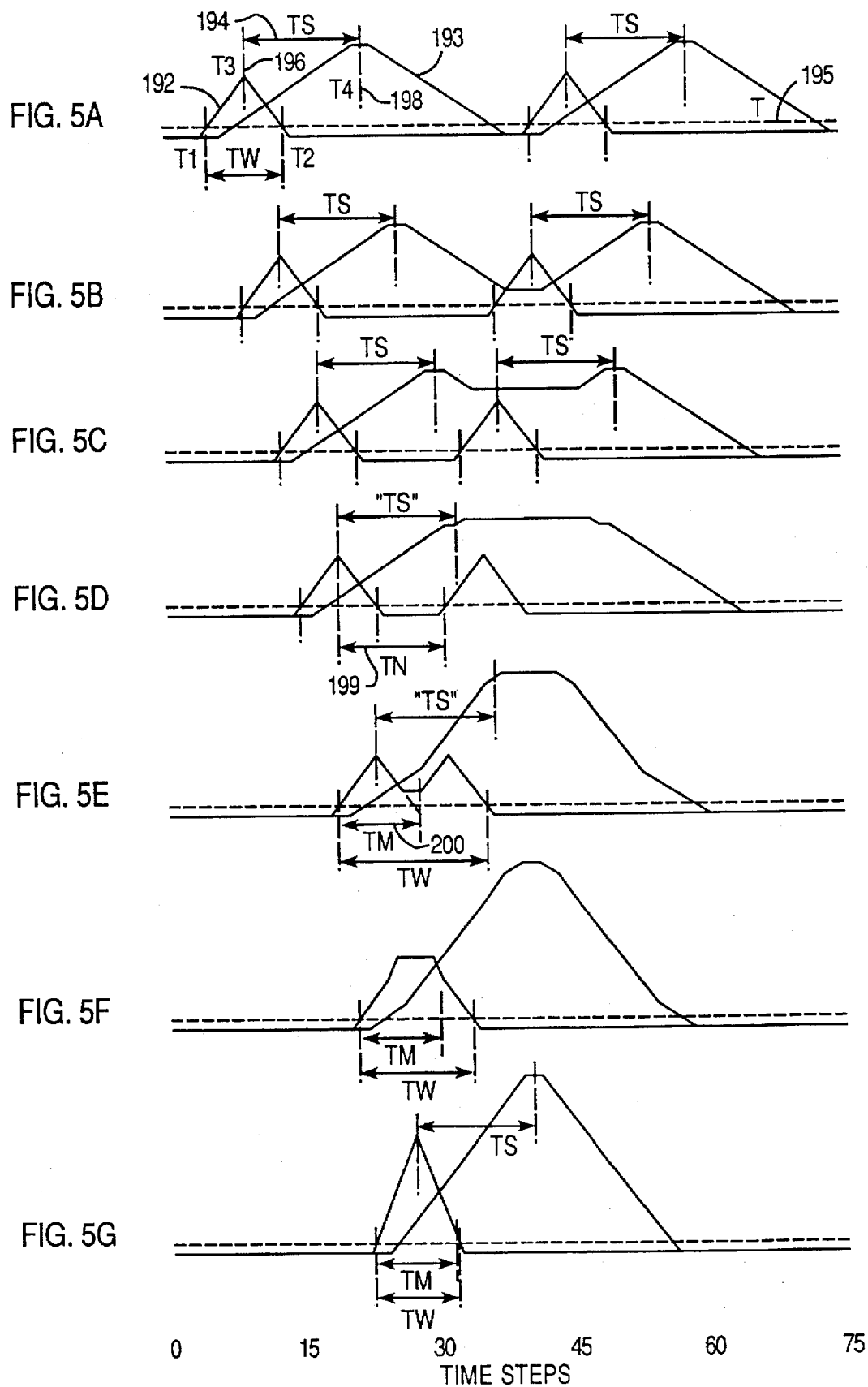

METHOD AND APPARATUS FOR DIGITALLY BASED HIGH SPEED X-RAY SPECTROMETER

GOVERNMENT RIGHTS

The U.S. Government has rights in this invention pursuant to Contract No. DE-FG03-92ER81311 awarded by the Department of Energy.

CROSS-REFERENCE TO RELATED APPLICATIONS

This application claims priority from, and is a Provisional Application No. 60/002,266, filed Aug. 14, 1995, which Provisional Application is hereby incorporated by reference.

The following four commonly-owned applications, including this one, are being filed concurrently and the other two are hereby incorporated by reference into this one:

William K. Warburton and Bradley Hubbard entitled "METHOD AND APPARATUS FOR ANALOG SIGNAL CONDITIONER FOR HIGH SPEED, DIGITAL X-RAY SPECTROMETER" (Attorney Docket 17032-1-1) Ser. No. 08/702,327;

William K. Warburton and Bradley Hubbard entitled "METHOD AND APPARATUS FOR DIGITALLY BASED HIGH SPEED X-RAY SPECTROMETER" (Attorney Docket 17032-1-2) Ser. No. 08/695,063;

William K. Warburton entitled "METHOD AND APPARATUS FOR DIGITALLY BASED HIGH SPEED X-BAY SPECTROMETER FOR DIRECT COUPLED USE WITH CONTINUOUS DISCHARGE PREAMPLIFIERS" (Attorney Docket 17032-1-3) Ser. No. 08/695,602; and William K. Warburton and Carl Zhou entitled "METHOD AND APPARATUS FOR COMBINATORIAL LOGIC SIGNAL PROCESSOR IN DIGITALLY BASED HIGH SPEED X-RAY SPECTROMETER" (Attorney Docket 17032-1-4) Ser. No. 08/730,916.

BACKGROUND OF THE INVENTION

The present invention relates generally to systems for digitally processing the pulses generated in detector systems in response to absorbed radiation and, more particularly, to processing such pulses in low cost, high resolution, high rate spectrometers for x-rays or gamma rays.

There is a need, in very high counting rate applications such as synchrotron radiation research, for improved x-ray spectrometers. In many of these applications it is desired to detect and count x-rays of one particular energy under conditions where these x-rays of interest are greatly outnumbered by x-rays of a different but nearby energy. A typical example would include X-ray Absorption Spectroscopy (XAS) of dilute metallo-protein solutions, where elastically scattered incident x-rays (noise events) greatly outnumber the fluorescence x-rays (signal events) from the metal atoms of interest. Since the x-ray spectrometer's total count rate capability is limited by energy resolution considerations, it spends most of its time processing noise events, which limits the acquisition rate of good signal events. Under these conditions it is advantageous to employ multiple detector systems to increase the good signal acquisition rate. Commercial spectrometers with 13 channels are now commonly sold and many researchers are considering systems with up to 100 channels. This approach is limited by several factors, including cost, lack of high count rate capability with pileup inspection, the lack of an energy resolved analysis of the spectrum seen by each detector, the practical difficulties associated with retuning the processing electronics for a large number of detector channels, and, often, the sheer bulk of the required electronics.

Cost is an important issue because of the large number of detector channels to be implemented. Typical instrumentation for a single detector channel using a high quality analog spectroscopy amplifier and energy spectrum analyzer ("multi-channel analyzer" or MCA) costs approximately $6,000. The cost of outfitting the desired 100 channels is thus prohibitively expensive for the great majority of researchers. Because of price and counting rate considerations, usually only a energy window analysis ("single channel analyzer" or SCA) is used, even for systems with only a few detectors.

The throughput, or maximum countrate capability, of energy analyzing spectrometers is usually set by the time it takes for the energy analyzer to process a pulse. During this time the system is "dead" and cannot accept other pulses. Common Wilkinson-type MCAs, particularly the low cost variety available as personal computer cards, can be quite slow, usually limiting count rates to less than 50,000 per second. Faster MCAs of comparable accuracy are available, but are much more expensive. Because a factor of 10 increase is desired for synchrotron applications, MCAs are not usually employed and the cheaper and faster windowing SCAs are used instead.

To inspect for pileup, the spectrometer must be able to detect the arrival times of the pulses coming from the preamplifier and then reject those that are closer together than the spectrometer's shaping time. If this is not done, such pulses are summed by the processing circuitry ("piling up"), and produce spectral distortions in the output. Because pileup occurs as the square of the input pulse rate, pileup inspection is a necessity when operating at the high count rates encountered in synchrotron experiments. Common commercial spectroscopy amplifiers are primarily designed for nuclear applications, however, and do not function effectively with x-rays below 10 keV. Typical inspection intervals are 500 to 600 ns, meaning that pulses arriving closer together than this cannot be distinguished. For the very high data rates encountered in synchrotron applications, a shorter inspection interval of 200 ns or less would be a distinct benefit.

To be properly carried out, a significant fraction of important synchrotron experiments also require energy analysis. These are typically experiments done using softer x-rays, in the region of 2000–4000 eV, where the energy resolution of even the best spectrometers is not adequate to fully resolve the signal energy of interest from the background energies. In these cases a simple SCA window cannot be set to accept only signal counts. Instead a full energy analysis is required and peak fitting is used to extract the signal peak from any nearby background peaks.

Spectrometer tuning is an important issue because each channel requires individual adjustment each time a new range of x-ray energies is to be studied. In conventional instruments this involves, for each channel, setting the amplifier's shaping time, coarse gain and fine gain and then adjusting the SCA's window to only accept counts in the energy range of interest. Accomplishing this requires disconnecting the amplifier and SCA from each other and using a separate calibration system (usually an oscilloscope, gated amplifier and MCA) to make the window setting. Then the amplifier and SCA are reconnected. The procedure is laborious, time consuming, and difficult to accomplish without errors, particularly when large numbers of channels are involved.

Spectrometer bulk also becomes an issue when many detector channels are required. The conventional electronics required for a 13 element detector array alone completely fill an electronics rack. Thus considerably higher density is required if 100 element arrays are to be practically implemented.

For these synchrotron applications, and many others as well, it would thus be advantageous to have a low cost, small volume spectrometry device capable of providing full energy analysis with good energy resolution at high count rates and be further capable of being interfaced to a computer system so that necessary tuning operations could be accomplished automatically by an appropriate program.

SUMMARY OF THE INVENTION

The present invention provides a physically compact, low cost, high speed method and apparatus for processing the pulse signals from a detector-preamplifier system and providing a complete energy analysis of the radiation impinging on the detector. In specific embodiments, it can operate effectively with either continuous reset or periodic reset preamplifiers, performs pileup inspection, has a digital interface so that it can be easily connected to a computer, and allows all spectrometric functions and operating parameters to be adjusted or operated under external computer control.

The invention is designed to employ digital signal processing techniques to analyze the detector-preamplifier input pulses. In this way, the high sample rate, low cost analog-to-digital converters (ADCs) and low cost, high speed digital signal processors (DSPs) which are now available commercially for applications in the telecommunications industry can be used to meet the desired performance criteria. The invention is capable of duplicating the energy resolution and exceeding the pileup rejection performance of state of the art analog x-ray spectrometers and producing complete output spectra while operating at very high count rates which exceed those previously typical even of SCA systems. The use of low cost, high density digital circuitry allows reduction in overall costs by a factor of about 4 and physical volume by a factor of over 10, compared to commercial analog circuitry. The invention implements all spectrometry tuning functions digitally so that they may be handled automatically by an appropriate external computer program.

The invention's general design principle is that, for its intended application, obtaining high data throughput rates at low cost is more important than obtaining optimum energy resolution. This is achieved by carrying out the required digital pulse processing in two stages. The first stage uses "hardwired" digital combinatorial logic to implement time invariant filtering, while the second stage uses a programmable processor which makes adjustments and corrections to the first stage's output, based on time dependent parameters. It is precisely this division of labor that allows the invention to achieve its dual goals of high performance and low cost. The hardwired logic stage is described in detail in the above referenced application of Warburton et al. entitled "METHOD AND APPARATUS FOR COMBINATORIAL LOGIC SIGNAL PROCESSOR IN DIGITALLY BASED HIGH SPEED X-RAY SPECTROMETER" (Attorney Docket 17032-1-4) Ser. No. 08/730,916.

In the specific embodiment, the hardwired logic stage does not employ adaptive triangular filtering, symmetric or asymmetric cusp-like weighting, or any of the moving deconvolution schemes which are typical of the art to date. Such schemes require complex data operations including: multiplication; lookup tables for weighting functions; data set buffering for both time variant processing and interprocess synchronization; and the like. Instead, we have implemented shaping filters using only simple trapezoidal filtering in both a slow and a fast channel, using an algorithm which requires only addition and subtraction. As commonly practiced in the art, the output of the fast channel is used for pileup inspection and slow peak capture, while the slow channel filtering provides the noise reduction required to achieve good energy resolution. See, for example, the analog spectrometer design of Goulding and Landis, (U.S. Pat. No. 4,658,216). Processing all pulses identically and eliminating all complex data operations so simplifies the first stage design that it can be readily implemented in, for example, a single medium sized field programmable gate array (FPGA) and still process over 500,000 counts/second (CPS). For comparison, a similar sized device was required simply to implement the state machine required to control data flow in the digital spectrometer shown by Mort et al. (U.S. Pat. No. 5,349,193).

Used alone, however, such a simple filter, does not produce competitive spectroscopic performance, compared to existing analog devices, which is why the more complex schemes found in the art have been developed. In the present invention, a second stage of processing is then applied, using a programmable computer (typically an onboard microprocessor or DSP chip) to apply the time variant corrections which are required to achieve competitive performance. These corrections, however, do not need to be carried out at the system's sampling speed, which can easily be 10's of mega-Hertz, but only at the average signal pulse rate, which will be 10 to 100 times slower. Thus relatively complex corrections can be implemented while still using an inexpensive processor. Moreover, not all possible corrections must be implemented simultaneously. Because the processor's operation is software controlled, the implemented corrections can be precisely tailored to the requirements of the detector-preamplifier combination by loading an appropriate program when the system is configured at startup. In a specific implementation, for instance, this combination of factors allows the 500,000 cps data rate noted above to be accommodated by only a $40 DSP chip.

Thus the present invention is to distinguished from the two classes of solutions which have previously been devised to digitally process pulses in x and gamma ray spectrometers: the "hard-wired" class where all the computations required to identify pulses in the data stream and extract their amplitudes with time dependent corrections and optimizations are performed using hardwired logic; and the "computer analysis" class where all these operations are performed under software control. The former class includes the devices of Koeman (U.S. Pat. No. 3,872,287), Lakatos et al. (U.S. Pat. No. 5,005,146), Georgiev et al. (IEEE Trans. Nucl. Sci. 41(1994) 1116–1124, Mort et al., Jordanov and Knoll (IEEE. Trans. Nucl. Sci. 42 (1995) 683–685, and Farrow et al. (Rev. Sci. Instr. 66 (1995) 2307–2309. Commercialization of the Georgiev, Mort and Jordanov devices has been attempted by the companies Target, Inc., Princeton Gamma-Tech, Inc., and Amptek, Inc., respectively. Examples of the latter class have been reported by Takahashi et al. (IEEE Trans. Nucl. Sci. 40 (1993) 626–629, Al-Haddad et al. (IEEE Trans. Nucl. Sci. 41(1994) 1765–1769. It is worth noting that the latter class has only been employed for research and developmental work. No examples have been commercialized, presumably due to the extreme cost of a fast enough processor needed to keep up with realistic data rates. The present invention thus defines a new, "hybrid"

class, which distributes digital filtering between what may be considered a hardwired preprocessor and a programmed signal corrector.

This partitioning of the spectroscopic filtering process between a hardwired processing circuit and a programmable digital computer should not be confused with the multichannel analysis (MCA) step, which often follows the filtering step and is used to produce an output spectrum of the photon energies seen by the detector. While the sorting and binning of the filtered pulse amplitudes is also commonly handled by a dedicated digital computer, these functions are not conceptually a part of the filtering process. Therefore, although the topology of many systems found in the art may appear to be similar (with a computer functioning as a MCA following a digital filtering stage), the innovative use of this computer in the present invention, as described both above and in the specification below, is entirely different.

In a specific implementation, a single digital signal processor (DSP) computer is actually used to implement four logically separate functions: the inventive filtering functions; the MCA function; controlling the analog conditioning front end; and handling data input/output to a system control computer.

In this same specific implementation, the invention is used in conjunction with an analog signal conditioning (ASC) front end, as described in the application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1) Ser. No. 08/702,827, to remove the slowly time varying components from the input data stream in order to reduce the number of bits of accuracy required in the system's ADC. The input control parameters to this ASC are set digitally by the DSP and adjusted as required to maintain the conditioned signal within the ADC's input range. After digitization, the pulse stream is processed by a hardwired logic unit which detects pulses, implements trapezoidal filtering, and performs pileup inspection. It further captures both good peak and baseline values which it passes to the DSP for further processing. The DSP performs the computations and corrections which convert peak values into accurate energy values and then bins the results to produce MCA spectra if required. Although the action of the ASC introduces distortions into the hardwired filtering procedure, the DSP can make appropriate corrections using both its values of the ASC control parameters and unfiltered signal values as appropriate. By monitoring the level of the baseline between peaks, the DSP can also correct the peak heights for less systematic variations which may occur for a variety of reasons.

In the invention, the above referenced hardwired digital processing stage is designated as the FiPPI because it implements filtering, peak detection, and pileup inspection. The FiPPI processes every data sample, but performs only the small set of filtering and inspection functions which are required to detect and accurately capture the amplitude of x-ray pulses in the input data stream. The DSP computations required to process the FiPPI outputs to produce accurate x-ray energy values are more complex, but need to occur only as often as actual events are detected. As noted above, this division is beneficial because it minimizes both the amount of expensive fast logic required and the speed (and hence cost) of the DSP required. The result is lower cost and higher performance than if either approach were used singly.

In the preferred embodiment, the DSP is a commercial digital signal processing circuit. All of its functions are implemented in software. These functions fall into the general categories of: controlling the ASC; capturing FiPPI data values and correcting them to achieve optimized spectroscopic filtering accuracy; performing multichannel analysis to produce spectra; and transferring data and parameters between the system and the outside world. The circuits and software required to communicate with the outside world are readily accomplished by one skilled in the art.

The DSP generally controls the ASC by setting input values to the ASC's offset and slope DACs and then resetting the slope generator as required. The initial DAC settings are estimated when operation starts and the estimate of the slope DAC setting is updated from time to time to compensate for variations in the rate of arrival of x-rays to the detector. If the ASC output goes out of the ADC's input range, then the offset DAC is adjusted to restore it.

The DSP retrieves data from the FiPPI under interrupt control, as noted above. The interrupt is raised by the FiPPI to signal that it has captured a good event value. The DSP then reads FiPPI output registers containing the good event value, the value stored in the ICR counter, the unfiltered value of the FiPPI input, and any other values characterizing the captured event. Because the DSP's interrupt response is designed to be less than the minimum slow filter peaking time, this read does not add any paralyzable dead time to the overall system response. The good event value is converted into an energy value and such corrections are made as may be required to achieve acceptable accuracy. Then, if the result lies within the desired spectral energy range, multichannel analysis is accomplished by binning it to add to the spectrum being collected.

From time to time the DSP also requests a baseline value from the FiPPI. In this case the FiPPI captures the slow filter output value at an instant when no pulse is present in the filter, sets a baseline flag, and again interrupts the DSP. This value is read into the DSP the same way as good event values are. The set baseline flag allows the DSP to distinguish the two cases. Since baseline values are captured when no pulses are present they correspond by definition to events with zero energy. The DSP collects and uses these values to independently establish the zero energy point in the spectrum. Statistics can also be collected on the baseline values and used for diagnostic purposes such as monitoring the energy resolution of the complete spectrometer.

Because the ASC subtracts a waveform from the signal incoming from the preamplifier, spectral distortions would result if no corrections were made. The fact that the DSP controls the waveform generator and therefore can compute the amplitude of the original preamplifier signal allows algorithms to be implemented in the DSP to correct for both the effects of subtracting a ramp of known slope and, in the case of continuous feedback preamplifiers, of subtracting a DC offset of known value. The DSP monitors the average energy value of baseline measurements after these corrections and, if it is not zero, subtracts this value from the energies of the good event values to compensate for any residual errors such as may arise from, for example, detector leakage current.

A further understanding of the nature and advantages of the present invention may be realized by reference to the remaining portions of the specification and the drawings.

BRIEF DESCRIPTION OF THE DRAWINGS

FIG. 2 is a block diagram of the invention showing its major parts and its connections to other equipment;

FIG. 3 is a block diagram of the Analog Signal Conditioning (ASC) and A to D hardware blocks of FIG. 2;

FIGS. 5A–5G are a series of timing diagrams demonstrating the relationship between corresponding pulses output by the Fast and Slow Filters of FIG. 4 and illustrating functions of the Peak Detector and Pileup Checker blocks of FIG. 4;

DESCRIPTION OF SPECIFIC EMBODIMENTS

1: System Overview

1.1. Preamplifier Input Signals

Figure 1A:
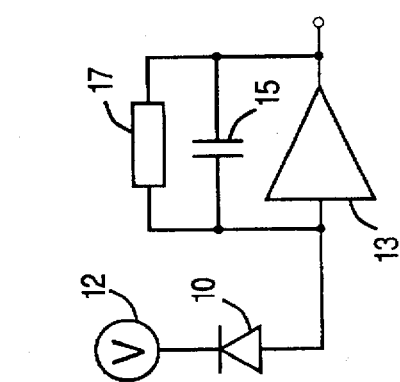
FIG. 1A is a circuit schematic of a representative detector-preamplifier system of the type which supplies pulses to the present invention.
Figure 1B:
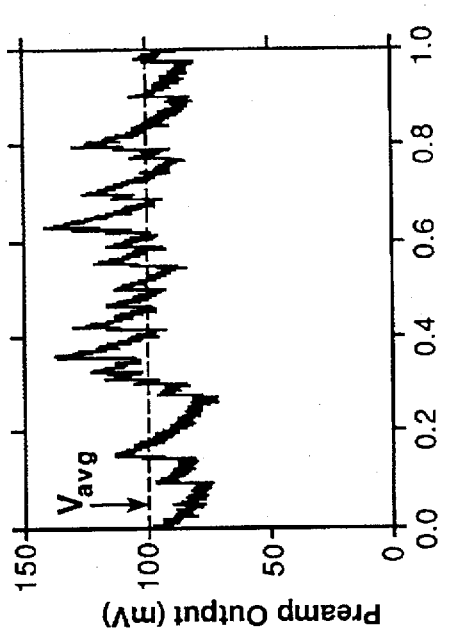
FIG. 1B is the trace of a typical output signal from the detector-preamplifier resulting from the absorption of a single x-ray in the detector.

The description of specific embodiments will be clarified by a brief discussion of the electrical pulses, each corresponding to a detected x-ray, which we intend to process. Such pulses, in the common case of a semiconductor x-ray detector, are generated by a circuit similar to that shown in FIG. 1A. This circuit comprises a semiconductor detector diode 10 reverse biased by a voltage supply 12 and connected to charge integrating preamplifier 13 with a feedback capacitor $C_f$ 15 and a feedback element 17. When diode 10 absorbs an x-ray of energy $E_x$, a charge $Q_x$ equal to $E_x/\epsilon$ is released, where the constant $\epsilon$ is characteristic of the diode semiconductor material. $Q_x$ is integrated on $C_f$ 15 and produces an output voltage step $V_x$ equal to $Q_x/C_f$—such as is shown in FIG. 1B. Obtaining an accurate estimate of $E_x$ therefore requires accurately measuring the voltage step $V_x$ in the presence of the preamplifier's output noise voltage, whose rms value is indicated in FIG. 1B by the value $\sigma$. In the present invention, digital filtering is used to reduce the amplitude of this noise and produce a more accurate estimate of $V_x$. While the present embodiment is an x-ray spectrometer, the filtering process does not depend upon the origin of the step-like pulses in the input signal, however, and can be more generally employed if desired.

Figure 1C:
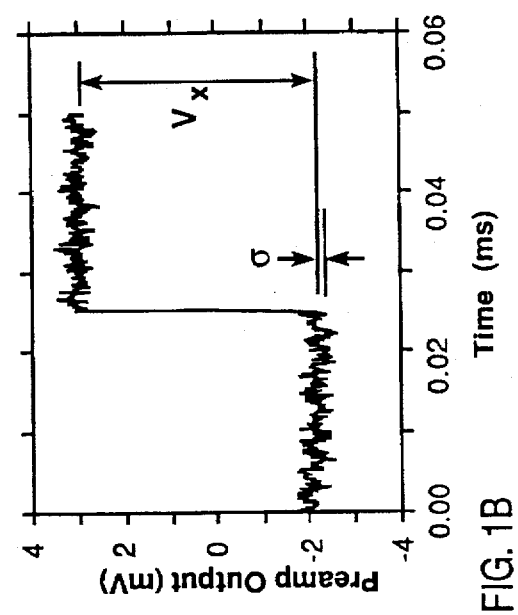
FIG. 1C demonstrates typical outputs from a continuous discharge detector-preamplifier over the course of multiple x-rays.

Functionally speaking, there are two basic types of energy sensitive preamplifiers. Because preamplifier 13 cannot integrate charge indefinitely without exceeding its linear operating range, the feedback element 17 is provided to discharge capacitor 15. In the first basic type, feedback element 17 continuously discharges capacitor 15 (the "CD" case), which is implemented in practice either by using a resistor for feedback element 17 (the classic case) or by other schemes such as forward biasing the JFET input transistor in preamplifier 13. A typical preamplifier output in the CD case is shown in FIG. 1C, and appears as a series of nearly vertical steps, each corresponding to a step such as shown in FIG. 1B, followed by an exponential decay as feedback element 17 bleeds charge off of capacitor 15. The average output voltage level, $V_{avg}$, results in a discharge current flow through feedback element 17 just equal to $I_{in}$, the input current flow from diode 10. This input current flow includes both leakage current and the current generated by the x-rays absorbed in diode 10. The maximum count rate the preamplifier can handle is set by the maximum value $V_{max}$ to which $V_{avg}$ can rise without fluctuations in the signal exceeding the preamplifier's linear operating range.

Figure 1D:
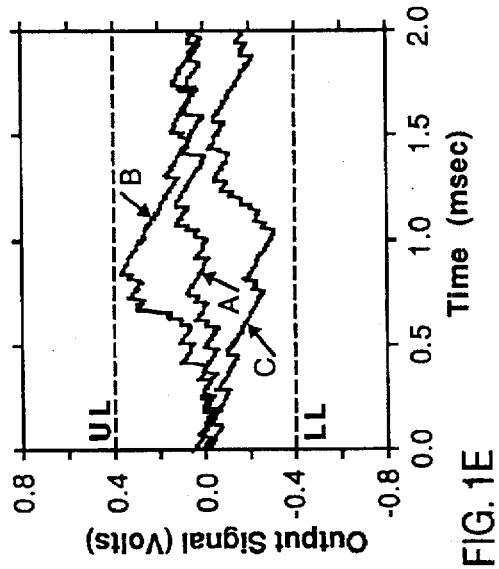
FIG. 1D demonstrates typical outputs from a periodic reset detector-preamplifier over the course of multiple x-rays.
Figure 1E:
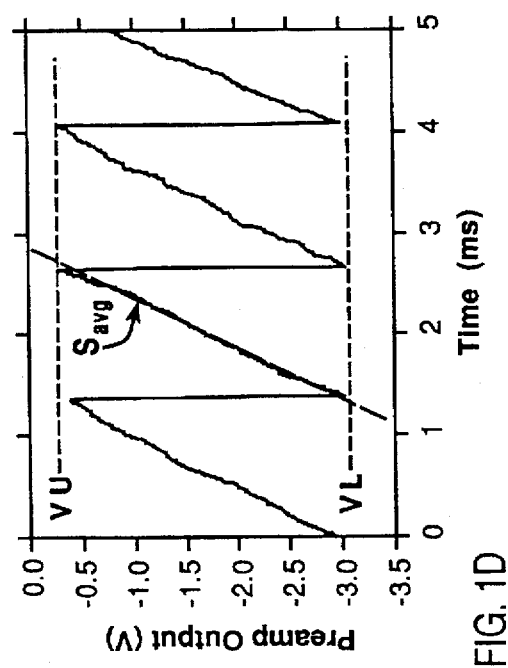
FIG. 1E shows three common x-ray pulse arrival patterns after the ASC has removed the reset-ramp portion of the signal.

In the second basic energy sensitive preamplifier type, feedback element 17 only discharges capacitor 15 at those moments when the output voltage of preamplifier 13 approaches the upper reset value VU which is slightly less than $V_{max}$. Feedback element 17 is essentially a switch, which remains closed until the voltage falls to a preset lower limit VL, when it opens again. This is the periodic reset ("PR") case and may be implemented either with a real transistor switch or by applying a pulse of light to the gate region of preamplifier 13's input JFET. This latter technique is known as pulsed optical feedback ("POF"). FIG. 1D shows a typical output for this case, which consists of a ramp of voltage steps from x-ray pulses which rise to VU, where reset occurs, causing the voltage to return to value VL, whence the process begins anew. Each voltage step has a shape similar to that shown in FIG. 1B and the resultant ramps have an average slope $S_{avg}$ equal to $I_{in}/C_f$. Typical fluctuations of the signal about the ramp are shown in FIG. 1E, where the individual x-ray arrivals are seen as small vertical steps.

1.2. Dynamic Range and Digitization Rate Issues

Selecting the ADC is possibly the single most important issue in implementing a digitally based x-ray spectrometer when both very good energy resolution and good pileup rejection at very high counting rates are required. First consider pileup rejection: If a digital system is to achieve the 200 ns pulse inspection times of modern analog x-ray spectrometers, it must sample at several times this rate to resolve pulses which are this closely spaced in time. As an estimate, 50 ns per sample or 20 megasamples/second (MSA) is required. Higher sampling rates could further improve the spectrometer's performance.

The requirement for good energy resolution, however, directly translates into ADC gain and dynamic range requirements, as is described in detail in the application by Warburton et al, entitled "METHOD AND APPARATUS FOR ANALOG SIGNAL CONDITIONER FOR HIGH SPEED, DIGITAL X-RAY SPECTROMETER" (Attorney Docket 17032-1-1) Ser. No. 08/702,327. The result of that analysis a specification for at least a 14 bit ADC operating at 20 MSA or greater rates for a typical x-ray spectrometer. Because such ADC's, while they exist, are currently expensive compared to the cost of the analog electronics which we want to replace, in our preferred embodiment we use an analog signal conditioners to reduce the dynamic range of the preamplifier's output signal sufficiently to allow the use of cheaper 10 bit devices, as described. As we further noted therein, the reduction from 14 bits to 10 bits is also advantageous in the system's digital processing sections because shorter word lengths are less expensive to process at a given data rate, further increasing the cost effectiveness of the final system.

1.3. Functional Organization

FIG. 2 shows the basic structure of the digital spectrometer. Input is from a conventional detector-preamplifier 20, such as is represented in FIG. 1A and described above. It feeds into a digital spectrometer 22 comprised of four primary functional blocks: an analog signal conditioning (ASC) block 23; an analog-to-digital converter (ADC) and control digital-to-analog (DAC) block 24; and the invention digital spectrometer comprising two major functional blocks: a hardwired digital filter, peak detector, and pileup inspector (FiPPI) block 25; and a programmable digital computer block 27, which in a specific embodiment is an embedded digital signal processor (DSP), for signal refinement, multichannel signal analysis, ASC control and input/output (I/O) functions. The digital spectrometer 22 connects to a general purpose control computer and interface 28, from which it receives parameter values to control its operation and to which it sends collected spectra. The function of ASC 23 is not required for the operation of the digital spectrometer blocks 25 and 27, but in our preferred embodiment is implemented according to the teachings of the above-referenced application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1) Ser. No. 08/702,324. The functions of blocks 25 and 27 can be implemented using various circuitry, but in our preferred embodiment are implemented according to the specification presented below. The general purpose control computer and interface 28 are conventional and may include any of a variety of common personal or laboratory computers and interface standards. The details of interfacing a computer to a DSP are well known to those skilled in the art of digital electronics.

The relations between the functional blocks of the digital spectrometer 22 are also indicated in FIG. 2. The spectrometer receives its input from detector-preamplifier module 20 and delivers complete x-ray spectra to general purpose control computer 28. The flow of signals and control within the spectrometer are indicated by the heavy lines connecting the functional blocks. Thus the ASC 23 accepts an analog signal from block 20 and conditions it for analog-to-digital conversion in ADC block 24, which outputs a digital replica of the same signal to the FiPPI 25. Values of this digital signal can also be captured directly by the DSP 27. The DSP 27 sets parameter values for both the ASC 23 and FiPPI 25, to control their operation, the former being first converted into analog signals by ADC block 24. The DSP 27 receives filtered amplitude values captured by the FiPPI 25 and uses them to compute x-ray energy values, which it bins to produce a multichannel spectral analysis (MCA) of the incident x-ray energies. When data collection is complete, DSP 27 sends its collected spectrum to control computer 28. Prior to the start of data collection, such required control parameters as gain, filter shaping times, pileup inspection levels, etc., are downloaded to the DSP 27 from the control computer 28.

1.4 ASC Overview

The ASC 23 has two primary functions: to reduce the input signal's dynamic range and to adjust its gain so that its noise is digitized with adequate resolution. It is based on the principle that the preamplifier signal, as in the examples in FIGS. 1C–1D, can be decomposed into two components: a "parametrically describable" signal fraction (PD), of large dynamic range; and a "signal of interest" signal fraction (SOI) carrying the signal information of interest but with a much smaller dynamic range (as in FIG. 1E). Because the PD signal fraction can be described by a relatively small number of parameters, the ASC can generate a reasonably faithful replica of it, which is then subtracted from the input signal. The remaining signal fraction, which is then a close approximation to the SOI signal fraction, then has a significantly reduced dynamic range to be digitized using an ADC with 10 bits.

The ASC 23 therefore functions by accepting a set of control parameters from the DSP 27 via ADC/DAC control block 24, using them to generate the PD replica, subtracting this from the input signal, and then adjusting the gain of the remaining SOI replica to give adequate noise resolution Because the DSP 27 knows the ASC control parameters it has set, it can use them as required to refine the energy spectrum it is collecting. Also, different types of preamplifier input can be accommodated merely by parametric adjustments. For CD preamplifiers, the LFF is merely a constant set to the value $V_{avg}$, as shown in FIG. 1C; for PR preamplifiers it is a sawtooth function, consisting of alternating ramps of slope $S_{avg}$ and resets, as shown in FIG. 1D. Further discussion of these points may be found in the teachings of the above-referenced application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1) Ser. No. 08/702,327.

FIG. 3 is a functional block diagram of ASC block 23 and ADC block 24. An amplifier 30 accepts an input signal from the detector-preamplifier 28 and amplifies the difference between it and the voltage level set by a digital-to-analog converter (DAC) Bias DAC 32. This allows the preamplifier signal to be centered about zero in the rest of the circuit, allowing maximum gains relative to the fixed amount of amplifier noise. A subtracter 33 subtracts the output of a LFF generator 35 from amplifier 30's output. LFF generator 35's output waveform is controlled by inputs from an Offset DAC 37, a Slope DAC 38, and a reset line 40 directly from the DSP 27. Subtracter 33's output feeds a variable gain amplifier 42, whose gain is controlled by a Gain DAC 43. A comparator 44 examines the signal and alerts the DSP 27 on interrupt line 45 if it passes outside the ADC's input limits. A low pass filter 47 removes any signal frequencies above the ADC's Nyquist limit before it reaches an ADC 48.

The ADC output connects both directly to FiPPI block 25 via a digital ADO output bus 50, and indirectly to DSP block 27 via the bus buffers 52. The buffers 52 attach to the bidirectional DSP data bus the DSP address lines 54, and the reset line 40. By appropriately loading values onto DSP address lines 54 and writing or reading DSP data bus 53, DSP 27 can load digital input values to the DACs 32, 37, 38, and 43. and sample the ADO output data stream on ADC output bus 50 as desired. Thus it both directly controls all the ASC 23's functions and can also directly measure the effect its actions on the ADC output 50. With appropriate control software, this creates the functionality allowing DSP block 27 first to initially set up preferred operating values for the ASC 23's overall gain and front end offset and then to dynamically control the LFF generator 35's operation as well. The details of using buffers to interface buses and ADCs to a DSP are well known to those skilled in the art of digital electronics and will not be described further.

For a PR preamplifier, the ASC's LFF generator 35 generates a waveform, consisting a DC offset combined with resetting ramp function whose slope is matched to the input signal's. This is then subtracted from the input signal. Three samples of the resulting signal, after gain adjustment and Nyquist filtering, are indicated in FIG. 1E. The quasiperiodic ramp structure has been removed and the individual x-ray pulses can be seen as vertical steps with fluctuations between their individual arrival times. Trace A shows the average rate of arrival case. Trace B shows a fluctuation in which the count rate temporarily increases and then decreases to return to the average rate. Trace C shows an opposite case of low rate fluctuation followed by a return to average. Further discussion of these fluctuations and the details of setting the ASC gain to accommodate them may be found in the above-referenced application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1) Ser. No. 08/702,327. The regions between the steps, which were approximately horizontal at the output of the preamplifier (i.e., as shown in FIG. 1B), are now negatively sloped by the average slope value which was subtracted. The amplitudes of the steps themselves (i.e., $V_x$ in FIG. 1B) are not appreciably modified by this procedure and are to be recovered by the digital spectrometer.

For CR preamplifiers, the ASC output would look much like FIG. 1C, except that the vertical scale would be adjusted to fill the ADC's entire input range. In this case the regions between the x-ray pulses are not linear, but have the same exponentially decaying slopes as the preamplifier, since the latter is DC coupled to the ASC.

Since it will be important to understanding the DSP's spectroscopic correction routines later in the specification, we emphasize that, because both the offset and slope subtracted by the ASC are set by the DSP 27 via DACs 37 and 38, the DSP has full knowledge of these parameters and can use them as required.

1.4. FiPPI Overview

Figure 4:
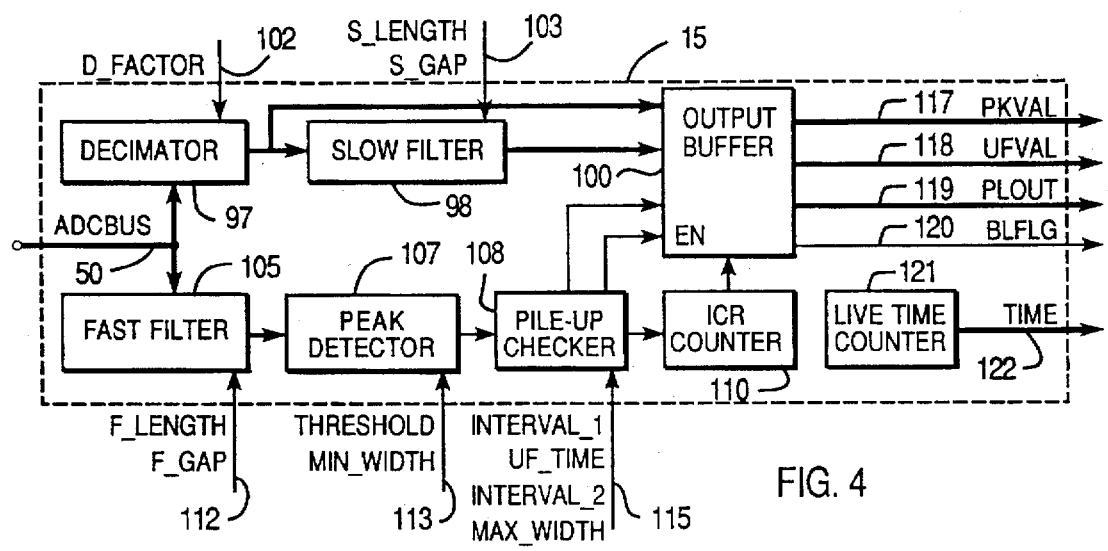
FIG. 4 is a block diagram of the Hardwired Digital Signal Processor hardware block of FIG. 2.

The FiPPI 15 functions which occur in one or another specific implementations comprise, as shown in FIG. 4, a decimator 97, a slow trapezoidal filter 98, an output buffer 100, a fast trapezoidal filter 105, a peak detector 107, a pileup checker 108, and an input count rate (ICR) counter 110, and a system livetime counter 121. The FiPPI operation is controlled by several adjustable digital parameters which are loaded into the FiPPI before the spectrometer system commences operation. These include a decimation factor 102, slow filter length and gap 103, fast filter length and gap 112, peak detector threshold and minimum width 113, and several pileup inspection test parameters 115. We summarize these function here in order to clarify our later discussions of FiPPI—DSP interactions. A complete description of all FiPPI functions may be found in the above referenced application by Warburton et al. entitled "METHOD AND APPARATUS FOR COMBINATORIAL LOGIC SIGNAL PROCESSOR IN DIGITALLY BASED HIGH SPEED X-RAY SPECTROMETER" (Attorney Docket 17032-1-4) Ser. No. 08/730,986.

The decimate by N function breaks up the input from the ADC into successive blocks of N values and outputs the average value of each block at 1/N th the frequency of the input data stream. The adjustable parameter N, input as D_Factor 102, is typically a power of 2, taking the values 1, 2, 4, 8, etc. The primary function of the decimator is to reduce the amount of First-In-First-Out (FIFO) memory required to implement long filtering times in the FiPPI's slow filter.

Both the slow and fast filters produce the digital equivalent of analog filtering by a symmetrical trapezoid function. The value of the slow filter output trapezoid in the middle of its flattop region constitutes a measurement of the energy of the corresponding detected x-ray. The trapezoids' peaking times (the times required to rise from zero to their flattop values) and flattop lengths are externally loaded parameters 103,112, with falltimes equaling risetimes. The filters produce these outputs by forming the running average of the difference of two delayed offset differences. The offset difference delays are implemented using FIFO functions. The fast filter is much shorter than the slow filter and normally runs at full clock speed. The slow filter works with the decimator output at 1/N clock speed and can easily produce filter times of several microseconds or more using FIFOs which are only 32 words deep.

Understanding the various FiPPI functions will be aided by an examination of FIGS. 5A–5G, which show the outputs of the FiPPI fast 192 and slow 193 filters as the time decreases between two consecutive pulses. As this time decreases, the slow filter outputs overlap more and more until finally their peak values, representing the step heights, are no longer valid. The time TS 194 to sample the slow filter output is given by the time between the peak T3 196 of the fast filter and the peak 198 of the slow filter. By requiring that sequential fast peaks be separated by more that a test time TN 199 one assures that the peak maximum is valid (i.e. Not piled up). Fast peaks are identified by comparing the output of the fast filter to the threshold level T 195. If two consecutive peaks are sufficiently close in time, as in FIGS. 9E–9G, then the fast peaks pile up as well. If this condition is not correctly identified, then the slow peak will be sampled under pileup conditions. We address this problem below.

Rather than simply discriminating the fast filter's output, in the present invention it is inspected for signal pulses by a peak detection circuit which looks for M or more consecutive values above the threshold level T 195 and, finding such a set of values, captures the arrival time of the maximum signal value T3 196 within the set. This arrival time T3 is thereafter defined as the arrival time of the associated signal pulse. The externally loaded parameters T and M may be adjusted to optimize sensitivity to low signal levels while maintaining adequate immunity to triggering by noise.

The general function of the pileup inspector is to assure that the slow filter trapezoids are sampled in the middle of their flattops and that this sampling occurs only when this value results from a "good event." A good event is one which results from a pulse which is separated from both its predecessor and successor by acceptable time intervals, which must at least be greater than the slow filter's peaking time. That is, a good pulse must be free of both leading edge pileup and trailing edge pileup.

Pileup inspection is implemented using two or more tests. The first "slow" test counts the time between successive outputs of the fast channel peak detector and rejects pulses which are closer together than an external parameter TN 199, which is set to exceed the slow filter peaking time.

The other two tests are for "fast pileup" pulses, which are pulses that are so close together that they do not resolve as separate fast filter output peaks, as noted above. The first fast pileup test uses the fact that, for a fully isolated pulse, the duration D of a digital trapezoidal filter's output is independent of the input pulse's amplitude. A pair of closely piled-up pulses separated by time d, however, extends the duration of the fast filter output to D+d. Counting the time a fast filter peak spends above the threshold T and comparing to a parameter TM 200, as in FIG. 9A, thus allows detection of the close pileup condition. The parameter TW is therefore adjusted to be a value slightly longer than the maximum expected for a single pulse event.

Whereas the first fast pileup test compares the fast peak's width at threshold to a test value, the second fast pileup test compares its width at half amplitude to a test value set to be slightly greater than the half width of an ideal fast pulse. This test is pulse amplitude independent, and, while more complex to implement, has increased accuracy for very low amplitude fast pulses which may not exceed the threshold by very much and whose durations above a fixed amplitude threshold are therefore strongly amplitude dependent. It operates by implementing a comparison similar to that used in the threshold width comparison test above, except that a delayed copy of the fast pulse is tested by counting its time above an adjustable threshold H, where H is one half of the fast pulse's amplitude, as captured by the fast peak detection circuit.

The pileup inspector captures good event flattop amplitudes from the slow filter output by starting a counter when a fast peak is detected. If this counter reaches the value S without another fast peak being detected, the output buffer captures the slow filter's output value at that instant. Then, if the time interval preceding the peak was also long enough, so that it qualifies as a good event, a DSP interrupt flag is raised to signal that a good event has been captured. The unfiltered value of the FiPPI input is also captured at this instant. The externally loaded parameter S is essentially the trapezoidal risetime plus one half of the flattop, adjusted for timing offsets. After a good event value is captured, a second attempt is made to count to S. If this is successful, it means that the slow filter output has returned to its baseline level, allowing a value to be captured on DSP request for use in normalization corrections.

An ICR counter is incremented whenever an x-ray is detected, whether it is piled up or not. This value can be read and zeroed each time a good value is read, or at longer intervals, so that statistics on the fractional pileup rate can be collected. Its major function, however, is to provide an accurate estimate of the true data rate being processed so that accurate deadtime corrections can be made when quantitatively precise results are required.

A system livetime counter is also implemented in the FiPPI logic. It consists of a stepdown counter attached to the system clock and gated by the DSP to count whenever the DSP is enabled to be interrupted by the FiPPI with captured slow filter peak values. Because, as we shall see, there are times when the data entering the FiPPI are not valid (as during resets) and times when the DSP is not ready to accept captured values (as when it is resetting the ASC after a reset), it is important to be able to accurately record the true time when the system is available to collect valid data.

In some implementations the FiPPI may capture other values from the data stream as well, as described in the application by Warburton entitled "METHOD AND APPARATUS FOR DIGITALLY BASED HIGH SPEED X-RAY SPECTROMETER FOR DIRECT COUPLED USE WITH CONTINUOUS DISCHARGE PREAMPLIFIERS" (Attorney Docket 17032-1-3) Ser. No. 08/649,062.

In the preferred implementation, as shown in FIG. 4, the FiPPI sends four values to the DSP each time it captures a slow peak value: the slow peak amplitude PKVA1 117, the number of fast peaks detected PLOUT 119, the baseline flag BLFLG 120, the livetime counter output TIME 122. In some implementations a fifth value UFVAL 118 captured from the decimator output is also sent.

2. System Design Issues 2.1. Philosophy of the Spectrometer Design

The FiPPI 25 is implemented in the specific embodiment using combinatorial logic implemented in either a hardwired or re-programmable logic (e.g., FPGA). It is clocked at the same rate as ADO 48, and, accepting digitized signal data on ADC output bus 50, digitally performs the filtering, peak detection, amplitude capture, and pileup inspection functions which are central to the operation of a modern x-ray spectrometer.

In the present invention, the processing scheme we have implemented in the hardwired combinatorial logic unit completely processes received data at the rate of one point per clock cycle by pipelining the multiple operations required by each data point. This means that, if we denote by $O(n,j)$ the jth operation required by data sample n, then at time step i, we will simultaneously execute operations $O(n,1)$, $O(n-1,2)$, $O(n-2,3)$, etc. Since all these operations are performed in parallel, once per clock, as many operations as necessary can be implemented without having to pay any speed penalty.

Processing signals using pipelined digital combinatorial logic in this manner has significant limitations imposed by our speed and cost criteria, however. First, if each pulse receives identical (time invariant) filtering treatment to restrict the logic's complexity and cost, compensatory adjustments cannot be made based on pulse-specific conditions. Secondly, while hardwired addition and subtraction are readily implemented to function at high clock speeds, multiplication and division are considerably slower and require many more logic functions to implement. Since the slowest implemented operation sets the maximum clock rate, allowing multiplication and division either restricts the maximum data rate or requires much more costly high speed components. This produces a dilemma, since the limited pulse processing achievable using logic operations no more complex than addition or subtraction is not accurate enough to fully meet our spectroscopic performance goals.

The present invention resolves this dilemma by employing a hybrid strategy that divides the digital signal processing functions into two steps. In the first step, simple high speed pipelined operations are implemented, using combinatorial logic, which preprocess the data stream from the ADC. These FiPPI operations, as described above, identify the incoming x-ray pulses and extract initial estimates of their amplitudes. In the second step, these amplitude estimates are passed to a programmable microprocessor (or digital signal processor) which then makes such corrections (based upon preamp type, local operating conditions, etc.) as are required to achieve the desired spectroscopic accuracy.

This division of processing is advantageous for several reasons. First, the simplified pipelined preprocessing can be made both very cheap and very fast. For example, in a specific embodiment, it can be implemented in a single FPGA and still accommodate an ADC running at 20 MSA. Second, while the functions in the second step are typically more complex, they need only be executed at the average rate at which x-ray signal events actually arrive, which is typically at least an order of magnitude slower than the ADC sampling rate. In a specific embodiment, for example, the sampling rate is 20 MSA, while the maximum design input data rate is 500,000 cps, a factor of 40 less. Third, as will become clear further on, the required corrections can be written in the form of simple formulae, which need only to be applied to the single peak values. Thus, in practice, making corrections after peak capture is both simpler and faster than making them on the data stream itself (through preconditioning or deconvolution) as practiced in existing art.

In this embodiment, the first processing step is carried out in the FiPPI 25, while the second step is carried out in digital signal processor DSP 27, operating under software control. The FiPPI performs the following high speed primary processing steps: trapezoidal filtering to improve signal to noise, x-ray pulse detection, pileup inspection, and filter peak capture. The DSP accepts valid peak values from the FiPPI and performs the more complex calculations needed to produce accurate energy values and bin them appropriately. For the intended maximum average x-ray arrival rate of 500,000 cps in the specific embodiment, the DSP 27 needs only 20 MIPS capability, which is readily available commercially in inexpensive single chip designs.

Our approach can thus be summarized as follows. The processing required by every digital sample at the ADC's output data rate is implemented in combinatorial logic in the FiPPI, which uses pipelined processing to inexpensively implement its tasks. The more complex computations required to convert peak amplitudes into accurate x-ray energy values, which need only be carried out at the much slower average x-ray counting rate, are handled by a dedicated DSP. Partitioning the signal processing functions in this manner allows the resultant circuit to be both simpler and less expensive than if all required computations were carried out using only hardwired logic or only a dedicated processor.

2.2. Theory of Trapezoidal Filtering

The trapezoidal shaping filter function values $\{T_i\}$ of a stream of data values $\{d_i\}$ at times $\{i\}$ are given by the equation $$T_i = -\sum_{k=i-2L-G+1}^{i-L-G} d_k + \sum_{k=i-L+1}^{i} d_k \quad (1)$$

Thus $T_i$ is the difference between two running averages, one from i-L+1 to i and one from i-2L-G+1 to i-L-G. Here L and G, the slow filter interval length $L_S$ and gap interval $G_S$ enter the module as parameters 103. Comparing to the output of an analog trapezoidal filter, we note that L corresponds to the peaking time $\tau_p$ and G to the flattop time $\tau_f$. When the $G_S$ is zero, the trapezoidal filter becomes the more commonly used triangular filter function. Both forms have been extensively discussed in the analog spectrometer literature. The trapezoidal function has the benefit that its amplitude is independent of charge collection time in the detector if the gap $G_S$ is made adequately long, thus avoiding the phenomenon of ballistic deficit. On the other hand, its signal to noise ratio for short shaping times is not as good as that of the triangular function. In the present case the selection is completely under the control of the experimentalist who sets the control parameters S_Length and S_Gap 103. Triangular filtering is known to provide theoretically optimum signal to noise in the limit of white series noise, which is the case encountered when using short shaping times to process pulses at very high data rates. These issues are well understood by those skilled in the field of detector signal processing. The point of primary importance is that, among non-adaptive filters, the triangular shape gives optimum performance at high data rates and it can be obtained from the difference between two sums, as per Eqn. 1.

An important feature about the function in Eqn. 1 is that its output, when operating on data with a constant slope, is proportional to that slope and not zero. That is, the baseline is non-zero if the data entering the FiPPI have a slope, as they generally will, particularly since one action of the ASC is to subtract a ramp of constant slope from the analog input data stream. Hence regions between pulses in the digitized data stream will typically have a slope that depends on both the rate and average energy of the x-rays arriving in the detector. This has two major consequences. First, peak amplitudes will only be meaningful if measured with respect to the baseline, which therefore means that the baseline must also be determined accurately for accurate x-ray energies to be extracted. This point will be discussed in detain in Sect. 3.4 below. Second, if the slope in the input signal is not constant (as in the output of a DC preamplifier, where the signal slope between x-rays pulses decays exponentially), then the baseline will also vary in time and, in fact, will have to be measured locally for each detected x-ray pulse. The application by Warburton entitled "METHOD AND APPARATUS FOR DIGITALLY BASED HIGH SPEED X-RAY SPECTROMETER FOR DIRECT COUPLED USE WITH CONTINUOUS DISCHARGE PREAMPLIFIERS" (Attorney Docket 17032-1-3) Ser. No. 08/695,062, describes techniques to determine the peak amplitude more accurately in the exponential decay case.

3. DSP: Digital Signal Processing Computer and Logic 3.1. DSP Overview

In accordance with our design philosophy, the DSP primarily carries out those tasks, procedures, and computations which are required either on a "per event" basis or less often, as may be required by to maintain system level operations. It is thereby distinguished from the FiPPI, which implements those computations which must be executed once per ADC sample. As shown in FIG. 2, in the present spectrometer implementation, the DSP 27's major tasks include interacting with the general purpose control computer and interface 28, adjusting and controlling the ASC 23, and collecting, correcting and histogramming data values from the FiPPI 25. In the general practice of the invention, these functions could be met by a wide variety of combinations of processor and memory, the choice in any particular embodiment being an engineering decision based on such considerations as cost, speed, size, and so forth. Further, while a histogrammed output of the distribution of pulse heights found the "spectrum," is the typical output of a spectrometer, in the present invention the DSP 27 is not so limited. If other analysis is desired it can be programmed in. An easy case might be the number of pulses within a narrow height distribution: effectively a single channel analysis. A more complex case might include looking for time sequences of specific amplitudes, as in looking for some specific decay process.

3.2. DSP Hardware Implementation

An NEC μPD77016 processor is used in the specific embodiment. It was selected because it is a fast, low cost, 16 bit DSP with enough internal memory to hold both its control program and the spectra produced by its MCA function. It has a 1.5K 32-bit word program memory, a 2.0K 16 bit word X-data memory, and a 2.0K 16 bit word Y-data memory. The X-data memory is dedicated to MCA spectra, allowing spectra to be histogrammed into up to 1024 bins, each 32 bits (or more than 4 billion counts) deep. The Y-data memory is divided into three sections. The first is used to store the variables and constants required to control system operation; the second is used for storing data to monitor system performance; and the third is set up as a circular buffer to temporarily store FiPPI events for MCA processing. Internal memory, while not necessary for the invention is advantageous because it not only reduces total package count and cost, but also may allow higher speed operation since internal memory can usually be addressed more quickly than external memory. The NEC μPD77016 executes instructions at one half its externally applied clock frequency, which can be up to 66 MHz. In the specific embodiment it is clocked at exactly twice the rate of the ADC and FiPPI, to produce synchronous operation of one instruction per ADC sample, and the ADC clock operates at 20 MHz. It has 4 external interrupt lines which allow it to respond to the ASC 23, FiPPI 25, and external control computer 28.

The general issues associated with programming and interrupting microprocessors and DSPs are well known to those skilled in the art and will not be described in any detail. General flow charts of the control programs will be shown and attention will concentrate on the specific algorithms which have been invented to produce the desired instrument function.

Figure 6:
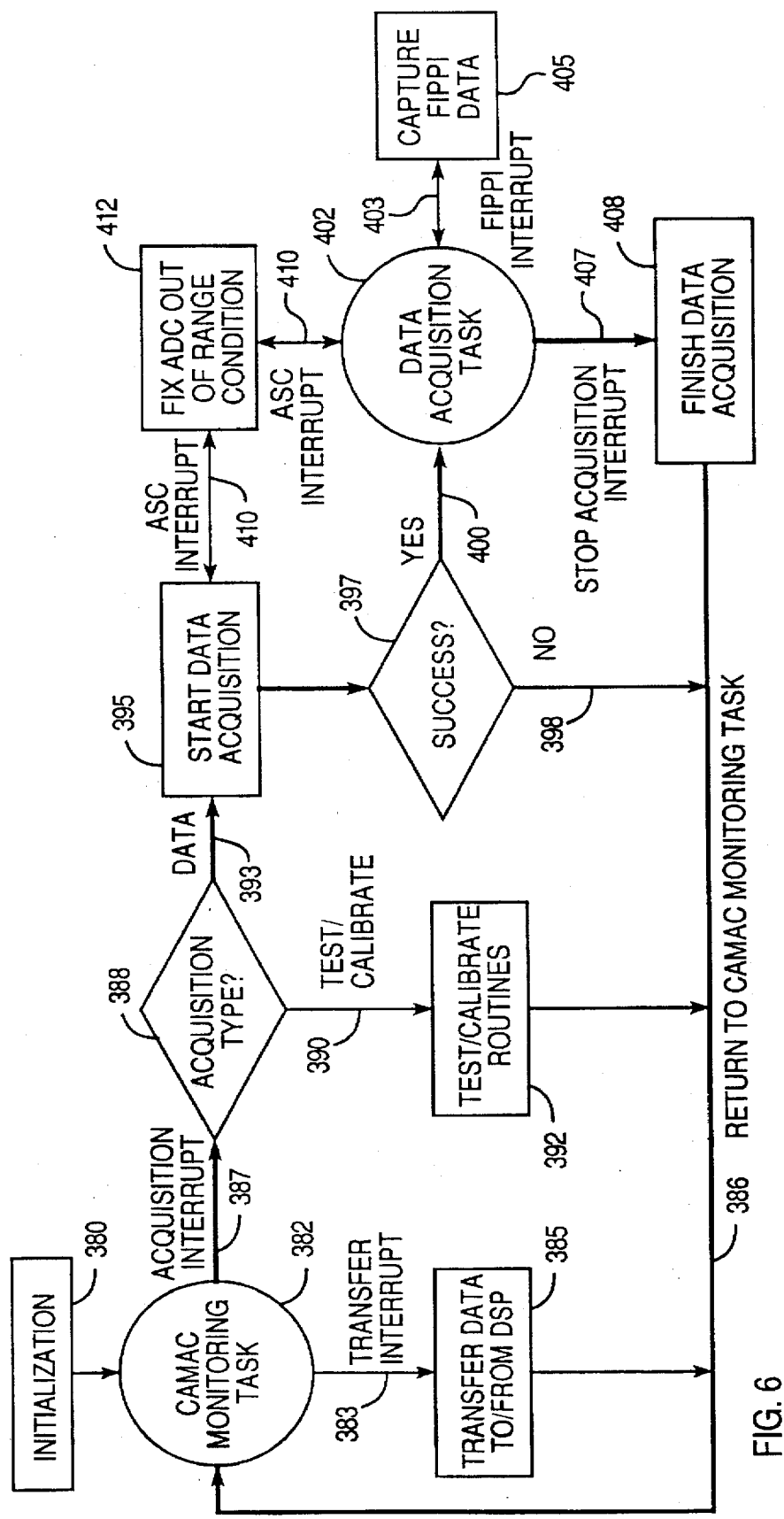
FIG. 6 is a flow diagram showing the major features of the DSP's control program.

3.3. DSP High Level Software Descriptions
3.3.1. Supervisory Control Program FIG. 6 shows a high level flow chart of the supervisory control program used in the specific embodiment. Bold arrows trace the flow of program control through a single data collection cycle. The DSP control software was written using μPD77016 assembly language. Operation begins with downloading the DSP's program and Initialization 380, which includes setting up registers and initializing constants in Y-data memory. The program then proceeds to its primary control loop, the CAMAC Monitoring Task 382. In the specific embodiment the interface to the control computer was implemented using the CAMAC interface standard, IEEE Standard 583-1975. The choice of interface is not critical to the function of the invention. In the CAMAC Monitoring Task 382 the DSP is essentially in a loop, waiting to be interrupted.

Data transfers to and from the DSP are initiated by the control computer 28 through its interface to the digital spectrometer 22 The details of implementing such interfaces are well known to those skilled in the art. These requests for data transfer cause the interface to generate a Transfer Interrupt 383 to the DSP. When such a Transfer Interrupt 383 is received, the DSP moves to Transfer Data To/From DSP 385. Here it reads two status registers in the interface 28 and uses their contents to determine whether it should transfer a 16 bit data word to a DSP memory location from an interface register or vice versa. It makes the requested transfer and then takes return path 386 to the CAMAC Monitoring Task 382. Multiple word data transfers are similarly implemented using the DSP's block data transfer mode and can operate at rates up to 2 MBytes/second.

Before the DSP can control the digital spectrometer 22 effectively, it requires the values of various constants and control parameters. Some of these (the FiPPI 25 filter lengths, for example) can be downloaded from the control computer 28. Others must be determined experimentally (a good starting estimate for the Slope DAC 38, for example) by calibrating the system. The former are transferred from the control computer 28 as described in the previous paragraph. Of particular note is the control word RUNTASKS, which is a set of flags to control DSP program flow.

When an Acquisition Interrupt 387 is received, Acquisition Type 388 is determined by testing RUNTASKS. If the Type is Test/Calibrate 390, the DSP proceeds to Test/Calibrate Routines 392. These routines are used to verify correct system operation and calibrate the DAC controls 24 to the ASC. These routines include the following:

1) Write to Bias 32, Offset 37, Slope 38, and Gain 43 DACs to set the operating point of the ASC 2) Measure overall system gain. This is accomplished by first disconnecting or shorting any input to the spectrometer 22 and then recording the output of the ADC 48 for a series of voltage values applied to the negative input to Op Amp 30, which are generated by writing an appropriate series of digital values to the Bias DAC 32. A linear fit or regression can be made to the results to obtain the slope in units of ADC units per Volt input, which is just the digital spectrometer's gain. If the preamplifier gain is known in Volts per eV of x-ray energy, then this can be multiplied by the spectrometer's gain to obtain overall system gain in ADC steps per eV. If the preamplifier gain is not known, then a measurement of an x-ray source of known energy can be made and the result in ADC units divided by the x-ray's energy in eV to obtain the system gain in ADC units/eV, which can be divided by the spectrometer gain in ADC units/Volt to obtain the preamplifier gain in Volts/eV.

3) Calibrate Offset DAC 37 in ADC units, by the same process as in routine 2) above, to obtain the important normalization constant DACperADC, which is the number of Offset DAC steps required to change the ADC output by one step, and is directly proportional to the total gain in the ASC 23 (differing only by the fixed gain factor of Op Amp 30).

4) Calibrate the slope generator. This is done by setting known values into the Slope DAC 38 and measuring the time required for the generated slope signal to go out of the ADC input range. For a given ASC system gain (DACperADC) value, the slope should depend only on the current input from Slope DAC 38 and the size of an integration capacitor in the LFF Generator 35. This provides a good secondary test of the value of DACperADC.

5) Test ADC differential and integral non-linearity using the ASC's slope generator as a controlled input waveform.

6) Monitor ASC interrupts without acquiring spectrum data.

7) Capture ADC output signal traces with DSP. This mode, in which the ADC-DSP combination essentially operates as a simple digital oscilloscope, can be particularly useful for debugging detector problems by allowing representative signal traces to be captured.

8) Capture FiPPI Decimator output values. This has the same utility as routine No. 7, but works with the slower Decimator output.

9) Verify correct operation of the entire spectrometer chain. This is accomplished by first disconnecting or shorting any input to the spectrometer 22 and then operating the spectrometer "normally" to collect a spectrum, except that at regular intervals the voltage output of Bias DAC 32 is increased by a constant amount $\delta V$, where $\delta V$ is chosen to correspond approximately to the amplitude of the proamplifier signal step which would result from an x-ray of some convenient energy (e.g., 5,900 eV =Mn-$K_\alpha$ from Fe-55). Provided the time interval chosen is significantly longer than the FiPPI 25 slow filter peaking time, these generated steps will appear to the spectrometer exactly like x-rays of a single constant amplitude. The output spectrum should therefore consist of a single narrow peak. The central "energy" of this peak is a direct measure and test of the overall system gain. The width of the peak is a direct measure of the noise contribution of just the spectrometer and is therefore a valuable diagnostic that the complete instrument is operating correctly for the selected digital filter parameters.

These tests allow the invention digital spectrometer to be both self testing and self calibrating and are also useful for quality control tests in manufacturing. In normal operation, the control computer 28 runs a test suite of these programs to assure that the spectrometer is operating correctly prior to attempting to collect data.

When the Acquisition Interrupt Type is Data 393, then the DSP moves to the Start Data Acquisition Routine 395 which undertakes the following tasks to prepare for data acquisition (assuming a reset type preamplifier).

1) Set the ASC's Bias DAC 32, Offset DAC 37, Slope DAC 38, and Gain DAC 43 to specified values determined by the x-ray energy range, characteristics of the preamplifier, and initial rate estimates.

2) Reset the MCA data and statistics to zero.

3) Write control parameters Decimation Factor 102, Slow Filter Length and Gap values 103, Fast Filter Length and Gap 112, Peak Detector Test Values 113, and Pileup Checker Values 115 to the FiPPI and restart FiPPI operation.

4) Initiate ASC monitoring by observing ADC values versus time, with the slope generator reset line 40 held ON. Estimate the slope of the ramps in the preamplifier's output signal and compute a Slope DAC 38 value to match it. Wait for a preamplifier reset, load the reset value into Offset DAC 37 and turn the slope generator reset line 40 OFF. Test that reasonable values were selected and that the ASC is tracking the preamplifier output.

5) Enable ASC Comparator Interrupt, which interrupts the DSP if the output signal from the analog subsection 28 exceeds the input range to the ADC 48, as described in Sections 2.2 and 2.4.5.

6) Collect an initial set of baseline values (no x-ray event values) and compute baseline mean and variance. Check that values are reasonable. The use and updating of baseline events will be discussed in detail below.

7) Set up pointer values to a circular event loop buffer in DSP Y-data memory to prepare for receipt of FiPPI data.

8) Enable FiPPI interrupt signal DSPFLAG, which allows the FiPPI to signal the DSP that it has detected and captured a valid peak amplitude.

If any of these procedures fail, then the answer to the test "Success? 397" is NO 398, and the data collection aborts and takes return path 386 to the CAMAC Monitoring Task 382. Otherwise the DSP proceeds on path 400 to begin the Data Acquisition Task 402, which is described in further detail below.

While the specific embodiment of the invention spectrometer is designed to operate at a maximum average counting rates of 500,000 cps, or 2 μsec/count, it is also designed to allow slow channel peaking times as short at 0.5 μsec. This means that it must also be able to cope with burst data rates up to 2,000,000 cps, since burst data rates up to 1/peaking time are allowed by the FiPPI's pileup inspector. Therefore, to minimize total system costs, a software solution is employed in this specific implementation to allow the use of a less expensive DSP which is fast enough to process FiPPI data at its slower, average arrival rate, but which need not necessarily be fast enough to process the FiPPI data at the maximum burst rates allowed for particular peaking times. Burst data rates are handled by setting up a circular buffer memory in the DSP's Y-data memory. When a FiPPI Interrupt 403 (via FiPPI output signal DSPFLAG 302) to the Data Acquisition Task 402 occurs, it is serviced by the Capture FiPPI Data Routine 405. Here the DSP reads two 16 bit words from the FiPPI containing the values PKVAL 117, UFVAL 118, BLFLG 120, and PLOUT 119. It then writes these two words onto the circular buffer, and increments the pointer to their address. These operations require only 5 or 6 clock cycles and can easily keep up with the maximum burst data rate. Control then returns to the Data Acquisition Task 402, which processes any data it finds in the circular buffer. An alternative, hardware buffering solution described the above referenced application by Warburton et al. entitled "METHOD AND APPARATUS FOR COMBINATORIAL LOGIC SIGNAL PROCESSOR IN DIGITALLY BASED HIGH SPEED X-RAY SPECTROMETER" (Attorney Docket 17032-1-4) Ser. No. 08/730,916.

The Data Acquisition Task 402 proceeds until either a preset maximum number of events are processed or until a Stop Data Acquisition 407 occurs. In either case, the program proceeds to Finish Data Acquisition 408, whose primary functions are to disable the ASC Comparator Interrupt 45, disable the FiPPI interrupt, finish processing any remaining data in the circular buffer, and record the value in the livetime counter 121. The program then takes return path 386 to the CAMAC Monitoring Task 382, where the collected data can be unloaded by the Control Computer 28 using Transfer Interrupts 383 as described above.

Once the ASC Comparator Interrupt 45 is enabled in Start Data Acquisition Routine 395 task no. 5, an ASC Interrupt 410 can occur at any time, forcing a branch to the Fix ADC Out of Range Condition 412 routine, as described in Section 3.4.1 below. Once the ASC's output is back within the ADC's input range, the program resumes control at the point where it was interrupted.

3.3.2. Data Acquisition Task Software

Figure 7:
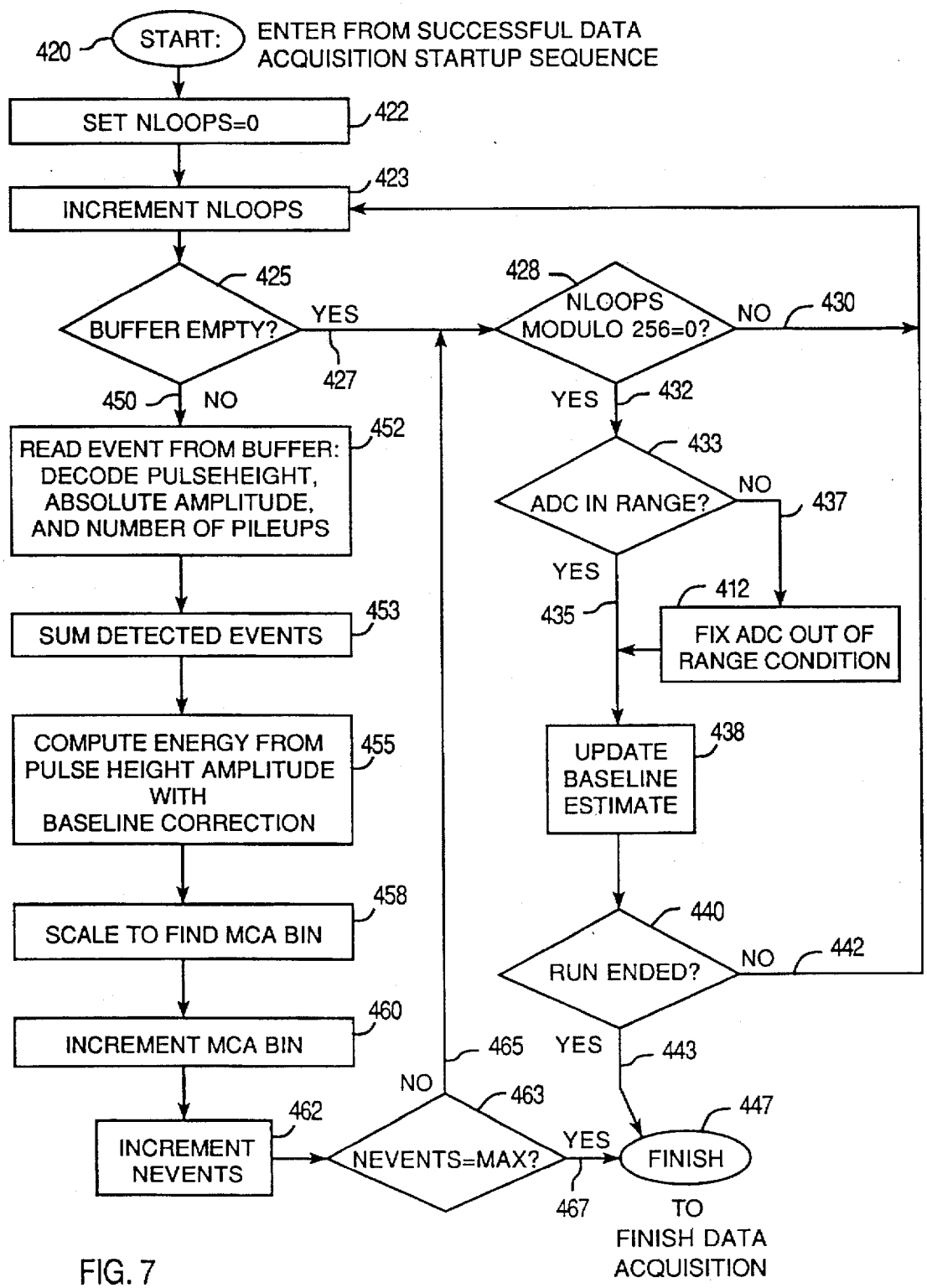
FIG. 7 is flow diagram of the Data Acquisition Task feature of the DSP's control program.

FIG. 7 shows a flow chart of a specific embodiment of the Data Acquisition Task 402. Control enters at Start 420, following successful completion of the Start Data Acquisition 395 task, and zeroes a counter NLOOPS 422. Increment NLOOPS 423 adds 1 to NLOOPS and a Buffer Empty? Test 425 is performed to see if the circular buffer contains any FiPPI data to process.

If the results of the Buffer Empty? Test 425 is Yes 427, a Test 428 is made to see if NLOOPS is a multiple of 256. If the answer is No 430, control passes to Increment NLOOPS 423 to start another iteration. If NLOOPS is a multiple of 256, then the Test 428 answer is Yes 432 and the output of the ADC 48 on the ADCBUS 50 is read directly and an ADC in Range? Test 433 is performed to assure that it is neither 0 nor full scale. In principle, this condition should always be signaled by an ASC Interrupt 410, but this requirement is so important to the correct operation of the digital spectrometer that it is double checked here. If the ADC in Range? Test 433 result is No 437, control branches to the same Fix ADC Out of Range Condition 412 routine mentioned above. If the ADC output is in range, the result of ADC in Range? Test 433 is Yes 435 the Update Baseline Estimate 438 routine is performed. This algorithm is described in detail below. The number 256 in Test 428 is not critical and was selected so that the baseline would be updated often enough to track changing experimental conditions but not so often that it represents a substantial computation burden within the Data Acquisition Task 402. A Run Ended? Test 440 of the CAMAC status register is then made to see if the Control Computer 28 wants to stop data collection. If the Test answer is No 442, control passes to Increment NLOOPS 423 to start another iteration. If the Test answer is Yes 443, the Data Acquisition Task 402 goes to Finish 447, where the program reads the value TIME 122 from the FiPPI 15 and then Returns to the CAMAC Monitoring Task 382.

On the other hand, if the result of the Buffer Empty? Test 425 is NO 450, then FiPPI data are available in the circular buffer for processing. A routine 452 therefore extracts the next pair of data values from the circular buffer and decodes them to recover values of the slow filter trapezoidal pulse height value PKVAL 117, the actual unfiltered value UFVAL 118 of the decimator output at the end of the filtering interval, the total number of x-ray events detected since the last good peak was captured PLOUT 119, and the baseline flag BLFLG 120. BLFLG 120 should only be 1 for calls from Update Baseline Estimate 438. A code fragment Sum Detected Events 453 then adds PLOUT 119 to a running total of detected events since the Data Acquisition Task 402 began. This total can be divided by the recorded livetime to obtain a true Incoming Count Rate estimate. Statistics on PLOUT values can also be collected and used to monitor for pathological experimental conditions such as counter overload due to excessive flux.

A code fragment Compute Energy From Pulse Height and Amplitude 455 then uses PKVAL 117 and UFVAL 118 to compute the x-ray's energy. This algorithm must be selected to be appropriate for the detector-preamplifier combination to which the invention spectrometer is connected. The choice will depend upon a number of factors, including whether a Continuous Discharge (CD) or Periodic Reset (PR) type of preamplifier is being used. The computed energy value is then adjusted for a Baseline Correction 455, if required. A code fragment Scale To Find MCA Bin 458 next calculates the Bin Index corresponding to this energy, after which Increment MCA Bin 460 then updates the spectral histogram being collected by adding 1 to the appropriate bin in the DSP 27's X-data memory. The collected histogram does not have to correspond to the full range of energies that the detector sees, and so some computed bin numbers may lie outside of the range of bin numbers being incremented. In this case no incrementation occurs.

The final step in the procedure is Increment Nevents 462. In this step both the total number of good events collected and the total number NEvents of histogrammed events are incremented as appropriate. The former number can be subtracted from the Incoming Count Rate to compute a ratio of pileup events to good event, if desired. NEvents allows a preset number of good data points to be collected. The Nevents=Max? 463 code fragment makes this test If the answer is No 465 (Max can be set to 0 for externally timed counting) control branches to the NLOOPS Modulo 256=0! Test 428 discussed earlier. If the answer is Yes 467, the Data Acquisition Task 402 proceeds to Finish 447 by branching to Finish Data Acquisition 408.

3.4. Spectrometer Control and Computation Algorithms

Because the present invention digital spectrometer system consists of four linked modules: the ASC 23, ADC/DAC 24, FiPPI 25 and DSP 27; several novel control and computation algorithms are required for them all to function effectively together. In the preceding Section 4.3 DSP High Level Software Descriptions, these were presented as the operations "Fix ADC Out of Range Condition" 412, "Compute Energy From Pulse Height Amplitude with Baseline Correction" 455, and "Update Baseline Estimate" 438. A fourth algorithm which is used to refine setting estimates for the Slope DAC 38 is also used in Fix ADC Out of Range Condition 412. The issues associated with these four procedures will now be described.

3.4.1. Fixing ADC Out Of Range Condition

This algorithm is described extensively in the application of Warburton et al. entitled "METHOD AND APPARATUS FOR ANALOG SIGNAL CONDITIONER FOR HIGH SPEED, DIGITAL X-RAY SPECTROMETER" (Attorney Docket 17032-1-1) Ser. No. 08/702,327, and is only described briefly here for completeness. The essence of the problem is that fluctuations in input counting rate can cause the output of the ASC analog subsection 23, which is the amplified difference between the preamplifier input and the LFF function generator 35, to temporarily fall outside the input voltage range to ADC 48 (i.e., the range LL to UL in FIG. 2E). When this happens, the data stream to the FiPPI 25 is no longer valid and so the DSP 27 must take corrective action. It does so by adjusting the signals to DACs 37 and 38, which control the operation of the ASC's LFF generator 35, until the ASC's output voltage is returned to the ADC's input range. The types of fluctuations which are commonly encountered include preamplifier resets, cosmic ray events in the 40 detector, and statistical fluctuations in the rate of arrival of x-rays to the detector. The algorithm is designed to deal with all of these situations in a rapid and efficient manner and, in the specific implementation, can restore proper operation in less than about 2 µs.

3.4.2. Algorithm to Update the Slope DAC 38 Setting Estimate

This algorithm is also described in detail in the application of warburton etal. entitled "METHOD AND APPARATUS FOR ANALOG SIGNAL CONDITIONER FOR HIGH SPEED, DIGITAL X-RAY SPECTROMETER" (Attorney Docket 17032-1-1) Ser. No. 08/702,327, and is only briefly noted here for completeness.

When the Slope DAC 38 is set correctly, then, on average, out-of-range excursions should be equally likely in the Hi and Low directions. On the other hand, if the rate of the incoming x-rays changes, then the Slope DAC will need to be adjusted appropriately. Therefore, each time the program calls the Fix ADC Out-of-Range Condition 412 routine it notes whether the excursion was in fact Hi or Low and collects statistics to determine whether the Slope DAC setting needs to be adjusted. Because, prior to starting to collect data, the DSP 27 measured the slope and computed an estimate of the correct Slope DAC 38 setting, we expect that only small adjustments will normally be required.

Therefore, each time an Out of Range occurs, we update a weight W, which has an exponentially decaying memory of past Out-Of-Range conditions, according to the formula $$W_i = ((N-1)/N)W_{i-31\ 1} + V_i/N \qquad (2)$$

where $V_i$ equals +1 for Hi and −1 for Low Out-of-Ranges. $W_i$ is then tested and, if it exceeds a test value V, it is zeroed and the Slope DAC 38 is adjusted by one unit in the appropriate direction. Otherwise nothing is done and the program moves on.

3.4.3. Computing Energy From Pulse Height Amplitudes

3.4.3.1. General Energy Computation

Some computation is required to convert the FiPPI 25 output value PKVAL 117 to an x-ray energy without introducing systematic errors. In principle, as discussed in connection with FIG. 1B and Eqn. 1, the output PKVAL is just a measure of the preamplifier output step height resulting from the absorption of an x-ray in the detector and should only require scaling by the system gain to convert it to an energy value.

In practice, however, the regions just before and just after the x-ray step are not nominally flat, as shown in FIG. 1B, but are tilted, as shown in FIG. 1E for the PR preamplifier case. There are two contributions to this tilt. The first arises because the ASC 23 has subtracted off the preamplifier's average ramp slope, as generated by the LFF generator 35. The second arises because of "leakage currents", which may come from either the detector or the preamplifier's first FET, but which result in a steady accumulation of charge on the preamplifier's feedback capacitor 15.

Figure 8A:
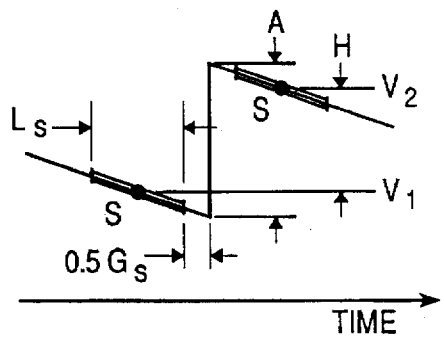
FIGS. 8A–8B are sketches showing the need for pulse height correction terms for two types of preamplifiers.

The interaction of the FiPPI 25 with this sloped signal is indicated in FIG. 8A (again for the simpler PR preamplifier case). While our intent is to obtain the amplitude A, the FiPPI produces the value H, which is the difference between the two shaded regions above and below the edge, which represent the two running averages in EQN. 1. A computation is therefore required to recover the desired value A from the measured value H.

3.4.3.2. The Algorithm for Computing Energy for PR Preamplifiers

An examination of FIG. 8A shows that, for a slow filter length $L_s$ with a gap time of $G_s$ (as described in conjunction with Eqn. 1), we can write:

$$H = V_2 - V_1 = A - S\,(L_s + G_s) \tag{3}$$

where $V_1$ and $V_2$ are the average voltages over the shaded filter regions and S is the slope. S is taken to have positive sign and consists of the difference of two components, the generated slope $S_g$ and the leakage slope $S_1$. Thus we can solve for A by:

$$A = H + (S_g - S_l)(L_s + G_s) \tag{4}$$

We now wish to obtain a precise estimate of the second term so that as little additional error is added to the measurement of $(V_2-V_1)$ as possible, since any such errors simply degrade the spectrometer's energy resolution. Both $S_g$ and $(L_s+G_s)$ are fixed quantities. $L_s$ and $G_s$ are parameters and are known exactly, as is the generated slope $S_g$. The leakage current slope $S_1$, is only quasi-static: while it may vary with count rate or other factors, it typically does so only slowly with time. The issue, then, is to obtain a precise measurement of $S_1$ so that the term $(S_g-S_l)(L_s+G_s)$ becomes essentially a correction constant.

$(S_g-S_1)$ can be determined by making measurements according to Eqn. 4 when A equals 0, i.e., when no x-ray events are present anywhere within the filter. In this case, H equals—$(S_g-S_l)(L_s+G_s)$ and corresponds to what would be called the "baseline" between triangular pulses in an analog system. By making a large number of measurements, we can estimate the mean value B of the leakage term to arbitrary precision. Thus:

$$B = \langle S_1(L+G_s)\rangle = \langle PKVAL_B + S_g(L_s + G_s)\rangle \tag{5}$$

where $PKVAL_B$ are baseline values H of the FiPPI 25 output value PKVAL 117 obtained when no pulses are present. The tests that assure the validity of $PKVAL_B$ values are described in detain in the application by Warburton et al. entitled "METHOD AND APPARATUS FOR COMBINATORIAL LOGIC SIGNAL PROCESSOR IN DIGITALLY BASED HIGH SPEED X-RAY SPECTROMETER" (Attorney Docket 17032-1-4) Ser. No. 08/730,916. Once B has been determined, we can compute the energy from:

$$E = G(PKVAL_N + S_g(L_s + G_s) - B) \tag{6}$$

where G is the system gain and these values of $PKVAL_N$ are those normally obtained from the FiPPI, i.e. representing the amplitudes of step-pulses found in the input data stream.

3.4.4. Alaorithm for Measuring Baseline Current Fraction B

The leakage current fraction B of the baseline must be determined with sufficient accuracy so that it does not significantly compromise the resolution with which x-ray energies are measured. A single measurement of B has the same variance as a measurement of PKVAL, since it is the same signal. Since, in Eqn. 6, the variances of PKVAL and B add in quadrature, the variance $\sigma_B$ of B should be of order 1/10 that of the variance $\sigma_P$ of PKVAL in order not to contribute substantially to the variance of E. This, in turn, means that B should be determined from an average of approximately 100 measurements of $PKVAL_B$, assuming Gaussian distributed errors.

The determination of B in one embodiment proceeds in two steps. The first occurs in task no. 6 of the Start Data Acquisition Routine 395, as described in Section 3.3.1 above. In this procedure, in the specific embodiment, 100 measurements of $PKVAL_B$ are made and then their average B and variance $\sigma_B$ are computed. This provides an accurate starting value of B.

Once the Data Acquisition Task 402 is under way, B is updated once every 256 loops in procedure Update Baseline Estimate 438, as indicated in FIG. 7. While a strict running average of B could be computed, in the specific embodiment the implemented procedure uses an algorithm similar to that of Eqn. 2 to provide an exponentially decaying past history. This has a first advantage that only the current value of B has to be stored, whereas in a running average over N values, all N must be stored so that the oldest can be removed from the average when the newest is added. Its second advantage is that it can be carried out very rapidly on a fixed point DSP if the ratios are powers of 2. Thus, we update B according to:

$$B_i = ((N-1)/N)B_{i-1} + x_i/N \tag{7}$$

where $x_i$ is the currently measured value of $PKVAL_B + S_g(L_s + G_s)$. For the value N equals 64, as in a preferred embodiment, this is then computed in the fixed point DSP by shifting a copy of $B_{i-1}$ left 8 places (multiply by 64), subtracting $B_{i-1}$, and shifting right 8 places to get $B_{i-1}$ times (63/64). Then $x_i$ is shifted right 8 places (divide by 64) and added to obtain $B_i$. No actual divisions or multiplications are required and the entire computation can be accomplished in about 6 machine cycles. This is important because it minimizes the amount of time when the DSP is not available for processing data. Even fairly rapid changes in B can be accurately tracked by this technique. The slowest response occurs at the maximum data rate when the DSP almost always finds the data Buffer Empty? Test 425 to be false and only collects one baseline sample for every 256 data values. At the design maximum rate of 500,000 counts per second, however, this is still about 2000 baseline samples per second. If experiments are being done under circumstances where B is expected to change rapidly, the NLOOP Modulo 256=0 Test 433 value 256 can be easily changed to a smaller number to sample the baseline more often.

3.4.5. The Algorithm for Computing Energy for CD Preamplifters

Figure 8B:
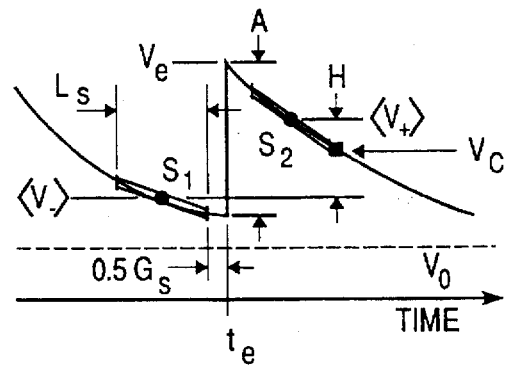

For a CD preamplifier, the signals on both sides of the x-ray step event are decaying exponentials with different average slopes, as shown in FIG. 8B. The situation is therefore more complex than for a PR preamplifier. We have developed an algorithm, which replaces Egn. 6 and is completely described in the application of Warburton entitled "METHOD AND APPARATUS FOR DIGITALLY BASED HIGH SPEED X-RAY SPECTROMETER FOR DIRECT COUPLED USE WITH CONTINUOUS DISCHARGE PREAMPLIFIERS" (Attorney Docket 17032-1-3) Ser. No. 08/693,062, to implement the required correction. The point of primary importance in the present instance is that changes in neither the DXP spectrometer hardware nor FiPPI firmware are required to operate successfully with the CD preamplifier. Rather, as described in the overview section 2.1, having rapidly processed the preamplifier signal in the FiPPI 25, we apply correction formulae in the DSP 27 once per found x-ray peak amplitude to produce accurate output spectra.

4. Conclusion

In conclusion it can be seen that the present invention provides a physically compact, low cost, high speed method and apparatus for processing the pulse signals from a detector-preamplifier system and providing a complete energy analysis of the radiation impinging on the detector. Combinatorial logic is used to perform a limited, but sufficient amount of processing at the sampling rate, while a programmed processor is used to carry out the more refined analysis at the event rate. This division of labor allows the invention to achieve high performance and low cost. When the invention is used in conjunction with analog signal conditioning to reduce the dynamic range of the input data, the programmed processor can also correct for pulse height errors introduced by the conditioning step. In addition, because the processor has access to all of the spectrometer's control parameters, the system can be programmed to be both self calibrating and self testing.

While the above is a complete description of specific embodiments of the invention, various modifications, alternative constructions, and equivalents may be used. As a first example, while the specific embodiment employs a signal conditioning front end to reduce the number of ADC bits required, the operation of the rest of the invention is not dependent on this construction. If cheaper, faster ADCs with more bits became available this section might be eliminated. Further, while it is cost effective to use a single digital signal processor to implement the various computations required in the invention, these computations could be distributed between multiple microprocessors and, in certain applications this might be more effective (e.g., when higher total count rate capability is required).

Further, while the specific implementation of the invention is as an x-ray spectrometer, the same processing techniques could clearly be used to process step-like pulses in an electronic signal arising from any source. Also, while the specific implementation bins the extracted amplitudes of the step-like pulses to form a spectrum, other analyses could be substituted for the binning step. For example, if the invention were employed in a positron emission tomography machine, then the pulses from each detector would be analyzed both for energy and, using additional circuitry, coincidence with all other detectors. Found coincident pairs of the correct energies would then be binned by detector pair, rather than by energy, for use in generating the final image. Therefore, the above description should not be taken as limiting the scope of the invention as defined by the appended claims.

What is claimed is:

1. A high speed, digitally based method for analyzing an electronic signal containing step-like pulses, which arrive at an average rate R, to estimate the amplitudes of at least some of said step-like pulses, the method comprising the steps of:

digitizing the electronic signal with an analog to digital converter (ADC), operating at a sampling frequency S which is greater than R, to produce a digital representation of the electronic signal, the representation being referred to as the digitized input signal;

providing digital combinatorial logic, referred to as the FiPPI, clocked at frequency S or a multiple thereof;

providing a programmable digital computing device (DSP) coupled to the FiPPI;

applying a digital shaping filter to the digitized input signal, using the FiPPI;

detecting the presence of the pulse signals in the digitized input signal, using the FiPPI;

extracting estimates of amplitudes of the pulse signals from the output of the digital filter, using the FiPPI;

transferring the estimates from the FiPPI to the DSP; and compensating the estimates for errors resulting from applying the digital filter to waveforms which are not ideal steps, using the DSP.

2. The method of claim 1, and further comprising the step, carried out using the DSP, of, correcting the pulse amplitude estimates for the condition that, excluding noise, the signal between pairs of successive pulses is not of constant value but instead possesses a slope, either positive or negative.

3. The method of claim 1, and further comprising the step, carried out using the DSP, of binning the estimates, so compensated, to produce a spectral representation of the amplitudes of the detected pulses.

4. The method of claim 3 wherein, if the time required for the digital filter to produce an amplitude estimate of a pulse signal is denoted by $\pi$, the amplitude capture, compensation and binning steps are achieved without adding to the system dead time by the steps of selecting and programming the DSP so that it can capture the amplitude estimates in less time than $\pi$;

storing the captured estimates in a memory buffer from which they can be retrieved at a later time for processing;

programming the DSP to perform the compensation and binning computations on estimates retrieved from the memory buffer during periods when it is not actively capturing and storing said estimates; and selecting and programming the DSP so that it can perform the compensation and binning computations in an average time which, in the application for which the instrument is intended, is less than the average interpulse arrival time minus the average time required to capture the estimates and store them in the memory buffer.

5. The method of claim 1, and further comprising the step, carried out using the DSP, of correcting the pulse amplitude estimates for manipulations of the electronic signal between its source and the input of the ADC.

6. The method of claim 5, and further including the step, carried out before said digitizing step, of conditioning the electronic signal according to a set of parameters to reduce the dynamic range of the input signal.

7. The method of claim 6, and further comprising the steps of:

sensing whether the input signal exceeds the input range of the ADC; and, if so, performing at least one of the following steps:

signaling the DSP to avoid capturing possibly spurious filtered amplitude estimates; and signaling the DSP to adjust the set of parameters to return the input signal to the ADC input range.

8. The method of claim 6, and further comprising the steps of:

communicating the set of parameters to the DSP; and using the values of the parameters in the set in said correcting step.

9. The method of claim 8 wherein, when said conditioning step includes the subtraction of a generated slope of value $S_g$, said correcting step includes the substeps of:

calculating the contribution $S_g$ makes to the output of the digital filter; and adding said contribution to said extracted amplitude estimate.

10. The method of claim 9 wherein the digital filter is a trapezoidal filter described by a length $L_s$ and gap $G_s$ and said contribution add added to said extracted amplitude estimate is calculated as $S_g (L_s+G_s)$.

11. The method of claim 6 wherein said conditioning step is carried out using circuitry, referred to as the ASC, including one or more of the following subcircuits: an input offset amplifier, a DAC connected to one input of the offset amplifier, a function generator, a subtracter, a variable gain stage, a comparator, and a low pass filter; and using the DSP to adjust the values of the parameters which control the operation of said subcircuits.

12. The method of claim 11, and further using the DSP to calibrate the system gain by the steps of:

adjusting the output of the DAC through a known sequence of values;

recording the output of the ADC at each point in the sequence; and using the sequence of pairs of DAC and ADC values so generated to compute the number of ADC steps per volt applied at the input, thereby providing a measure of the system's gain.

13. The method of claim 11, and further using the DSP to verify the correct operation of the entire signal conditioning and processing chain, in the absence of an input signal, by the steps of:

setting the DAC control parameter to a "reset" value which causes the ASC's output voltage to barely fall into the ADC's input range; and generating a series of voltage steps at the system input by the substeps of repeatedly incrementing, by a fixed value and at time intervals which exceed the peaking time of the digital filter, the DAC control parameter, and, when the ASC'S output voltage approaches the upper end of the ADC's input range, returning the DAC control parameter to the reset value, and, repeating; and generating a histogram for these input sequences of step-like pulses by binning the estimates output by the FiPPI; and verifying that the histogram so produced has a peak at a value that is correct for the amplitude of the voltage steps generated; and verifying that this peak's width correctly represents the noise performance of the entire signal conditioning and processing chain, excluding input signal noise.

14. The method of claim 11 wherein the function generator contains a slope generator, and, prior to collecting data from a preamplifier employing periodic reset, the DSP determines an initial setting for the slope generator by the steps of:

computing the slope generator's calibration factor, in volts per second per bit of its control DAC setting, from the implemented values of its integration capacitor and its control DAC's output current per bit setting;

turning off the slope generator;

adjusting the ASC offset and gain so that, between resets, the resultant, amplified preamplifier signal traverses the entire ADC input range;

measuring the time the amplified preamplifier signal takes to traverse the ADC input range;

knowing the ADC input range in volts, thereby measuring the slope of the amplified preamplifier signal in volts/second; and, if desired, repeating this measurement several times to obtain a better estimate of the average slope of the amplified preamplifier signal in volts/second;

knowing the set ASC gain factor, thereby also measuring the average slope of the input preamplifier signal in volts/second; and then, using the slope generator's calibration factor, computing the setting of the slope generator's control DAC in bits to match the preamplifier signal's average input slope in volts/second.

15. The method of claim 1 wherein the FiPPI, on request from the DSP, also extracts filtered amplitude estimates at times when pulse signals are absent, referred to as baseline events; and the DSP uses the values of one or more of these baseline events in its procedures to refine the filtered amplitude estimates.

16. The method of claim 15 wherein, having obtained an estimate B of the average baseline amplitude, said refinement is carried out by subtracting B from the filtered amplitude estimate.

17. The method of claim 15 wherein the DSP reduces the variance in its estimate of the current baseline value by computing a weighted average of a number of recent baseline values.

18. The method of claim 17 wherein the weighted baseline average $B_i$ at time i is computed according to the formula $$B_i = B_{i-1}(n-1)/n + b_i/n$$

where $b_i$ is the baseline value measured at time i and N is a constant, commonly a power of 2.

19. A high speed, digitally based spectrometry method for analyzing an electronic signal containing step-like pulses, as from a preamplifier whose input is a photon or particle detector and wherein the amplitudes of the step-like pulses represent the energies of the photons or particles absorbed in the detector, which arrive at an average rate R, to estimate the amplitudes of at least some of said step-like pulses, the method comprising the steps of:

digitizing the electronic signal with an analog to digital converter (ADC), operating at a sampling frequency S which is greater than R, to produce a digital representation of the electronic signal, the representation being referred to as the digitized input signal;

providing digital combinatorial logic (FiPPI) clocked at frequency S or a multiple thereof;

providing a programmable digital computing device (DSP) coupled to the digital combinatorial logic;

applying a digital shaping filter to the digitized input signal, using the FiPPI;

detecting the presence of the pulse signals in the digitized input signal, using the FiPPI;

extracting estimates of amplitudes of the pulse signals from the output of the digital filter, using the FiPPI;

transferring the estimates from the FiPPI to the DSP; and compensating the estimates for errors resulting from applying the digital filter to waveforms which are not ideal steps, using the DSP.

20. The method of claim 19, and further comprising the step, carried out using the DSP, of binning the estimates, so compensated, to produce a spectral representation of the amplitudes of the detected pulses and thus of the energies of the originating photons or particles as well.

21. The method of claim 19 wherein, if the time required for the digital filter to produce an amplitude estimate of a pulse signal is denoted by $\pi$, the amplitude capture, compensation and binning steps are achieved without adding to the system dead time by the steps of selecting and programming the DSP so that it can capture the amplitude estimates in less time than $\pi$;

storing the captured estimates in a memory buffer from which they can be retrieved at a later time for processing;

programming the DSP to perform the compensation and binning computations on estimates retrieved from the memory buffer during periods when it is not actively capturing and storing said estimates; and selecting and programming the DSP so that it can perform the compensation and binning computations in an average time which, in the application for which the instrument is intended, is less than the average interpulse arrival time minus the average time required to capture the estimates and store them in the memory buffer.

22. The method of claim 19, and further including the steps of:

before said digitizing step, conditioning the electronic signal according to a set of parameters to reduce the dynamic range of the input signal, said conditioning step including the subtraction of a generated slope of value $S_g$;

communicating the set of parameters to the DSP; and using the values of the parameters in the set in said correcting step;

wherein said correcting step includes the substeps of:

calculating the contribution $S_g$ makes to the output of the digital shaping filter; and adding said contribution to said extracted amplitude estimate.

23. The method of claim 22 wherein the digital filter is a trapezoidal filter described by a length $L_s$ and gap $G_s$, and said contribution added to said extracted amplitude estimate is calculated as $(L_s+G_s)$.

24. The method of claim 23 wherein, if the spectrometer's gain in eV/ADC step is denoted by G, and the extracted amplitude estimate is denoted by PKVAL, then the x-ray energies E are computed as:

$$E=(PKVAL+S_g(L_s+G_s)) G.$$

25. The method of claim 24 wherein, if the spectrometer's gain in eV/ADC step is denoted by G, the extracted amplitude estimate is denoted by PKVAL, and an estimated baseline estimate is denoted by B, then the x-ray energies E are computed as:

$$E=(PKVAL+S_g (L_s+G_s)-B)G.$$

26. The method of claim 19 wherein the FiPPI, on request from the DSP, also extracts filtered amplitude estimates at times when pulse signals are absent, referred to as baseline events; and the DSP uses the values of one or more of these baseline events in its procedures to refine the filtered amplitude estimates.

27. The method of claim 26 wherein, having obtained an estimate B of the average baseline amplitude, said refinement is carried out by subtracting B from the filtered amplitude estimate.

28. A high speed, digitally based spectrometry apparatus for analyzing an electronic signal containing step-like pulses, as from a preamplifier whose input is an photon or particle detector and wherein the amplitudes of the step-like pulses represent the energies of the photons or particles absorbed in the detector, which arrive at an average rate R, to estimates of the amplitudes of at least some of said step-like pulses, the apparatus comprising:

an analog to digital converter (ADC), operating at a sampling frequency S which is greater than R, which digitizes the electronic signal to produce a digital representation of the electronic signal, the representation being referred to as the digitized input signal;

digital combinatorial logic, referred to as the FiPPI, clocked at frequency S or a multiple thereof; and a programmable digital computing device (DSP) coupled to the FiPPI; wherein the FiPPI applies a digital shaping filter to the digitized input signal;

the FiPPI detects the presence of the pulse signals in the digitized input signal;

the FiPPI extracts estimates of the pulse signals' amplitudes from the output of the digital filter;

the DSP captures the estimates from the FiPPI; and the DSP compensates the estimates for errors resulting from applying the digital filter to waveforms which are not ideal steps.

29. The apparatus of claim 28, wherein the DSP additionally bins the estimates, so compensated, to produce a spectral representation of the amplitudes of the detected pulses and thus of the energies of the originating photons or particles as well.

30. The apparatus of claim 28 wherein:

said digital filter is characterized by a peaking time;

said digital computing device has an associated memory buffer for storing the received amplitude estimates for processing at a later time;

said digital computing device is characterized by a sufficiently high speed of operation that said operations of receiving the amplitude estimates and storing the amplitude estimates are performed in less time than the peaking time of the digital filter, so that one good value is captured before the next can be generated.

31. The apparatus of claim 28 wherein:

said digital computing device is programmed to perform said compensation operation during periods when it is not actively capturing and storing the estimates; and said digital computing device is characterized by a sufficiently high speed of operation that said operations of receiving the amplitude estimates, storing the amplitude estimates, and compensating the extracted estimates are performed in less time than an average interpulse arrival time.

* * * * *